US012760598B2

(12) United States Patent
Clark et al.

(10) Patent No.: US 12,760,598 B2
(45) Date of Patent: Oct. 13, 2026

(54) LAST STEP INDICATOR FOR LADDERS AND LADDERS INCORPORATING SAME

(71) Applicant: LITTLE GIANT LADDER SYSTEMS, LLC, Springville, UT (US)

(72) Inventors: Wesley V. Clark, Springville, UT (US); N. Ryan Moss, Mapleton, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 352 days.

(21) Appl. No.: 18/486,951

(22) Filed: Oct. 13, 2023

(65) Prior Publication Data

US 2024/0035337 A1 Feb. 1, 2024

Related U.S. Application Data

(63) Continuation of application No. 16/523,756, filed on Jul. 26, 2019, now Pat. No. 11,788,353.

(60) Provisional application No. 62/711,266, filed on Jul. 27, 2018.

(51) Int. Cl.
*E06C 7/00* (2006.01)
*E06C 7/08* (2006.01)

(52) U.S. Cl.
CPC ................ *E06C 7/003* (2013.01); *E06C 7/08* (2013.01)

(58) Field of Classification Search
CPC . E06C 1/18; E06C 7/003; E06C 7/006; E06C 7/08; H01H 3/14; H01H 3/141; H01H 3/142; H01H 13/16; H01H 17/10; B60R 3/02; B60R 3/04
See application file for complete search history.

(56) References Cited

U.S. PATENT DOCUMENTS 1,141,716 A 6/1915 Kjellstrom
3,233,702 A 2/1966 Feltrop
3,298,012 A 1/1967 Weller
(Continued)

FOREIGN PATENT DOCUMENTS

CN 203531733 U 4/2014
DE 102007033765 A1 1/2009
(Continued)

OTHER PUBLICATIONS

EP23219974.5 Extended European Search Report dated Feb. 12, 2024 (5 pages).

(Continued)

*Primary Examiner* — Colleen M Chavchavadze
(74) *Attorney, Agent, or Firm* — Dorsey & Whitney LLP

(57) ABSTRACT

Ladders and ladder components are provided including a rung assembly that provides an alert to a user of the ladder that they are standing on a particular rung or step. In one example, the lower most rung or step of a ladder includes a rung assembly having an alert mechanism. The alert mechanism may provide an audible and/or other sensory alert to a user when they step on the rung assembly so that the user recognizes their position relative to the ground or supporting surface. In one embodiment, the rung assembly is configured to include a base member, a displaceable member and an alert mechanism, wherein the displaceable member is positioned between the alert mechanism and the base member.

19 Claims, 22 Drawing Sheets

(56) References Cited

U.S. PATENT DOCUMENTS

| | | | | |
|---|---|---|---|---|
| 3,696,372 | A | 10/1972 | Garrett | |
| 4,403,373 | A | 9/1983 | Kuemmerlin | |
| 4,407,045 | A | 10/1983 | Boothe | |
| 4,566,150 | A | 1/1986 | Boothe | |
| 5,388,665 | A | 2/1995 | Newman | |
| 5,853,065 | A | 12/1998 | Hutson et al. | |
| 5,954,154 | A | 9/1999 | Ziolkowski | |
| 5,971,102 | A | 10/1999 | Brown | |
| 6,578,663 | B2 | 6/2003 | Schmitt et al. | |
| 6,657,547 | B2 * | 12/2003 | Ching-Yao | E06C 7/003 182/27 |
| 6,966,403 | B1 | 11/2005 | Chandra | |
| 7,174,994 | B1 | 2/2007 | Coffield et al. | |
| 7,364,017 | B2 | 4/2008 | Moss et al. | |
| 8,186,481 | B2 | 5/2012 | Moss et al. | |
| 8,365,865 | B2 | 2/2013 | Moss et al. | |
| 8,701,831 | B2 | 4/2014 | Moss et al. | |
| 9,145,733 | B2 | 9/2015 | Worthington et al. | |
| 9,711,028 | B1 | 7/2017 | Friedman | |
| 10,081,981 | B2 | 9/2018 | Finegan | |
| 10,260,282 | B1 | 4/2019 | Bautista et al. | |
| 10,487,578 | B2 | 11/2019 | Smith et al. | |
| 10,597,941 | B2 | 3/2020 | Moss et al. | |
| 10,718,161 | B2 | 7/2020 | Bernhardsson et al. | |
| 11,788,353 | B2 | 10/2023 | Clark et al. | |
| 2002/0070078 | A1 | 6/2002 | Barnett | |
| 2003/0057019 | A1 | 3/2003 | Schmitt et al. | |
| 2005/0173189 | A1 | 8/2005 | Berardi | |
| 2006/0032704 | A1 | 2/2006 | Chandra | |
| 2009/0084628 | A1 | 4/2009 | Smith | |
| 2009/0139798 | A1 | 6/2009 | Bernard | |
| 2010/0018800 | A1 | 1/2010 | Ventura et al. | |
| 2013/0140111 | A1 | 6/2013 | Desai | |
| 2014/0231170 | A1 | 8/2014 | Frame et al. | |
| 2015/0053504 | A1 | 2/2015 | Ross et al. | |
| 2015/0068842 | A1 | 3/2015 | Moss et al. | |
| 2015/0090533 | A1 | 4/2015 | Moss et al. | |
| 2015/0285476 | A1 | 10/2015 | Bina et al. | |
| 2016/0076304 | A1 | 3/2016 | Smith et al. | |
| 2016/0356086 | A1 | 12/2016 | Saccoccio et al. | |
| 2018/0094488 | A1 | 4/2018 | Major et al. | |
| 2020/0032585 | A1 | 1/2020 | Clark et al. | |
| 2022/0290497 | A1 | 9/2022 | Daprizio | |

FOREIGN PATENT DOCUMENTS

| | | | | |
|---|---|---|---|---|
| EP | 3191676 | A1 | 7/2017 | |
| GB | 529511 | A * | 11/1940 | H01H 3/141 |
| GB | 2296933 | B | 3/1998 | |
| KR | 200146389 | Y1 | 6/1999 | |
| WO | 2010102033 | A1 | 9/2010 | |

OTHER PUBLICATIONS

Extended European Search Report for EP Application No. 15840026.7, dated May 3, 2018.

Extended European Search Report for European Application No. 19841402.1, dated May 18, 2022.

International Search Report and Written Opinion of International Application No. PCT/US2019/043748, dated Oct. 18, 2019 (11 pages).

PCT International Search Report for PCT International Patent Application No. PCT/US2015/049446, mailed Jan. 15, 2016.

Extended European Search Report for European Patent Application No. 20189923.4 dated Nov. 24, 2020, 8 pages.

* cited by examiner

LAST STEP INDICATOR FOR LADDERS AND LADDERS INCORPORATING SAME

CROSS-REFERENCE TO RELATED APPLICATIONS

This application is a continuation of U.S. patent application Ser. No. 16/523,756, filed 26 Jul. 2019, which claims the benefit of U.S. Provisional Patent Application No. 62/711,266, filed on 27 Jul. 2018, the disclosure of each of which is incorporated by reference herein in its entirety.

BACKGROUND

Ladders are conventionally utilized to provide a user thereof with improved access to elevated locations that might otherwise be inaccessible. Ladders come in many shapes and sizes, such as straight ladders, straight extension ladders, stepladders, and combination step and extension ladders. So-called combination ladders may incorporate, in a single ladder, many of the benefits of various ladder designs.

Ladders known as step ladders, sometimes referred to as A-frame ladders, are self-supporting ladders, meaning that they do not need to be leaned against a wall, pole or other structure for stability. Rather, step ladders may be positioned on a floor (or other similar surface) such that at least three feet of the ladder, and conventionally four feet, provide a stable support structure for a user to climb upon, even in an open space (e.g., outside or in the middle of a room) without a wall, roof, pole or other type of structure being necessary for the stability of the ladder. Conventional step ladders may include a first rail assembly coupled with a top cap and a second rail assembly coupled with the top cap. One of the rail assemblies conventionally includes a plurality of rungs that are evenly spaced between the supporting surface (e.g., the floor or ground) and the top cap.

Regardless of the type of ladder being employed, using a ladder can present various risks to the user. For example, one potential hazard exists where a user is distracted or is not paying attention and loses track of which rung they are currently standing on—particularly when they are descending the ladder. In such a case, a user may think, for example, that their next "step" downward will place them on the ground at the bottom of the ladder when, in reality, there is still one more step for them to descend prior to reaching the ground. This misperception can result in the user stumbling on, or even missing completely, the lowest rung of the ladder. There is a continuing desire in the industry to provide ladders that reduce the risk of accident and provide improved safety and stability to a user thereof.

SUMMARY

Ladders and rungs assemblies for ladders are provided herein. In accordance with one embodiment of the present disclosure a ladder comprises a first assembly comprising a pair of spaced apart rails and a rung assembly coupled between the first pair of rails. The rung assembly comprises: a base member, a displaceable member disposed over a portion of the base member and configured to be displaced from a first position to a second position relative to the base member, and at least one alert mechanism associated with the displaceable member and configured to provide an audible alert when the displaceable member is displaced from the first position to the second position, wherein the at least one alert mechanism is directly coupled with one rail of the pair of spaced apart rails.

In accordance with one embodiment, the displaceable member is disposed between the at least one alert mechanism and the base member.

In accordance with one embodiment, the at least one alert mechanism includes a first alert mechanism coupled with the first rail and a second alert mechanism directly coupled with a second rail of the pair of space apart rails.

In accordance with one embodiment, the ladder further comprises a plurality of additional rungs extending between and coupled to the pair of spaced apart rails.

In accordance with one embodiment, the rung assembly is positioned to act as a lowermost rung of the ladder.

In accordance with one embodiment, the displaceable member includes an upper tread portion and a rear wall and a front wall.

In accordance with one embodiment, the at least one alert mechanism includes a pin, a collar slidably disposed about the pin, and a detent mechanism configured to hold the collar at a specified position on the pin until a force of a specified magnitude is applied to the collar.

In accordance with one embodiment, the displaceable member is directly coupled with a lower portion of the pin.

In accordance with one embodiment, the at least one alert mechanism is positioned and configured so that the detent mechanism releases the collar when the displaceable mechanism is in the first position.

In accordance with one embodiment, the ladder further comprises a pair of adjustable legs including a first leg movably coupled with the first rail and a second leg movably coupled with a second rail of the pair of spaced apart rails.

In accordance with another embodiment of the present disclosure another ladder comprises a first assembly comprising a pair of spaced apart rails and a rung assembly coupled between the first pair of rails. The rung assembly comprises: a base member and a displaceable member disposed over a portion of the base member and configured to be displaced from a first position to a second position relative to the base member, wherein the displaceable member is not in contact with the base member when in the first position.

In accordance with one embodiment, the ladder further comprises at least one alert mechanism associated with the displaceable member and configured to provide an audible alert when the displaceable member is displaced from the first position to the second position In accordance with one embodiment, the at least one alert mechanism is directly coupled with one rail of the pair of spaced apart rails.

In accordance with one embodiment, the displaceable member is disposed between the at least one alert mechanism and the base member.

In accordance with one embodiment, the at least one alert mechanism includes a first alert mechanism coupled with the first rail and a second alert mechanism directly coupled with a second rail of the pair of space apart rails.

In accordance with one embodiment, the rung assembly is positioned to act as a lowermost rung of the ladder.

In accordance with one embodiment, the at least one alert mechanism includes a pin, a collar slidably disposed about the pin, and a detent mechanism configured to hold the collar at a specified position on the pin until a force of a specified magnitude is applied to the collar.

In accordance with one embodiment, the displaceable member is directly coupled with a lower portion of the pin.

In accordance with one embodiment, the at least one alert mechanism is positioned and configured so that the detent mechanism releases the collar when the displaceable mechanism is in the first position.

In accordance with one embodiment, wherein the ladder further comprises a pair of adjustable legs including a first leg movably coupled with the first rail and a second leg movably coupled with a second rail of the pair of spaced apart rails.

Features, elements or aspects of one embodiment may be combined with features, elements or aspects of other embodiments without limitation.

BRIEF DESCRIPTION OF THE DRAWINGS

The foregoing and other advantages of the disclosure will become apparent upon reading the following detailed description and upon reference to the drawings in which.

DETAILED DESCRIPTION

Various embodiments of ladders, ladder components, assemblies and mechanisms are described herein. The described embodiments are not mutually exclusive of each other. Rather, various features of one described embodiment may be used in conjunction with features of other describe embodiments without limitation.

Figure 1:
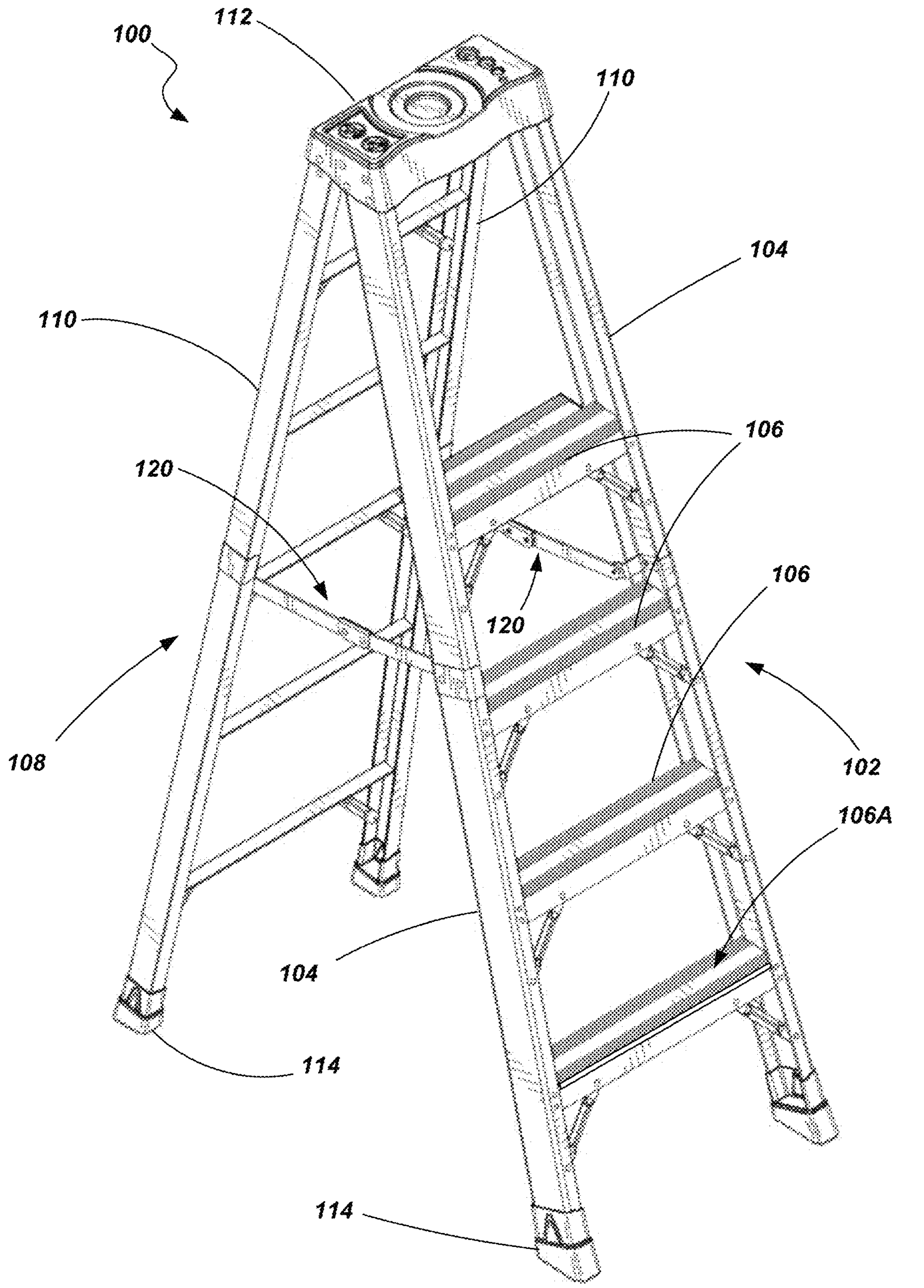
FIG. 1 is a perspective view of a step ladder according to an embodiment of the present disclosure.

Referring initially to FIG. 1 a stepladder 100 is shown in accordance with an embodiment of the present disclosure. The stepladder 100 includes a first assembly 102 having a pair of spaced apart rails 104 and a plurality of rungs 106 extending between, and coupled to, the rails 104. The spaced apart rungs 106 are substantially parallel to one another and are configured to be substantially level when the stepladder 100 is in an orientation for intended use, so that they may be used as “steps” for a user to ascend the stepladder 100 as will be appreciated by those of ordinary skill in the art. In the specific embodiment shown in FIG. 1, the lowermost rung comprises a rung assembly 106A as will be described in further detail below. In other embodiments, other rungs (e.g., second lowest rung, top rung, or all rungs) may alternatively, or additionally, comprise a rung assembly if desired.

The stepladder 100 also includes a second assembly 108 having a pair of spaced apart rails 110. The second assembly 108 need not include a plurality of rungs between the spaced apart rails 110. Rather, bracing or other structural components may be used to provide a desired level of rigidity and strength to the spaced apart rails 110. However, in some embodiments, the second assembly 108 may include rungs configured generally similar to those associated with the first assembly 102. The second assembly 108, thus, may be used to help support the stepladder 100 when in an intended operational state, such as generally depicted in FIG. 1.

The first and second assemblies 102 and 108 may be formed of a variety of materials and using a variety of manufacturing techniques. For example, in one embodiment, the rails 104 and 110 may be formed of a composite material, such as fiberglass, while the rungs and other structural components may be formed of aluminum or an aluminum alloy. In other embodiments, the assemblies 102 and 108 (and their various components) may be formed of other materials including other composites, plastics, polymers, metals, metal alloys or combinations of such materials.

A top cap 112 is coupled to a portion of the first assembly 102 and a portion of the second assembly. For example, the top cap 112 may be pivotally coupled to an upper end of the each rail 104 of the first assembly 102 along a common axis. In the embodiment shown in FIG. 1, the top cap 112 is also pivotally coupled to an upper end of each rail 110 of the second assembly 108 along another common axis. It is noted that the use of the term “upper end” merely refers to a relative position of the described components when the stepladder 100 is in an orientation of intended use orientation.

In one embodiment, the top cap 112 may simply be a structural component configured to facilitate relative coupling of the first and second assemblies 102 and 108. In other embodiments, the top cap may include features that enable it to be used as a tray or a tool holder. Thus, the top cap 112 may be used to organize a user’s tools, supplies and other resources while working on the stepladder 100. For example, such a top cap is described in U.S. Pat. No. 8,186,481 issued May 29, 2012 and entitled LADDERS, LADDER COMPONENTS AND RELATED METHODS, the disclosure of which is incorporated by reference herein in its entirety. It is noted that, for safety purposes, the top cap 112 is not conventionally configured as a “rung” or a “step” and may not necessarily be designed to support a user’s full weight. As with other components of the stepladder 100, the top cap 112 may be formed from a variety of materials. In one embodiment, the top cap 112 may be formed from a plastic material that is molded into a desired size and shape.

The stepladder 100 may additionally include a plurality of feet 114 (one associated with each rail) configured to engage a supporting surface such as the ground. The feet 114 may be configured in a variety of manners based on, for example, the type of environment in which the ladder is anticipated to be used. For example, the feet may be formed of a plastic or polymer material and can be configured with a plurality of ridges, knobs or other features configured to provided increased friction between the ladder and a relatively rigid supporting surface (e.g., concrete, tile or wood). On the other hand, the feet 114 may be configured with barbs or other sharp protrusions configured to dig into a relatively softer supporting surface (e.g., dirt or grass).

A pair of hinged braces, referred to herein as spreaders 120, are used to maintain a desired angle between the first and second assemblies 102 and 108 when the stepladder 100 is in a deployed or useable state. The hinged nature of such spreaders 120 helps to enable the first and second assemblies 102 and 108 to collapse into a stored state and then help lock the assemblies 102 and 108 in position relative to one another when in a deployed or useable state. It is noted that the spreaders 120 are not configured as rungs or platforms, or otherwise configured to support a user standing thereon. Rather, the spreaders 120 are simply configured to structurally maintain the ladder 100 in a deployed position while enabling the rail assemblies to be selectively collapsed relative to each other for storage and transportation of the ladder 100.

An example of a ladder having both rail assemblies directly pivotally coupled with the top cap 112 is set forth in U.S. Pat. No. 8,701,831 (application Ser. No. 12/716,126 entitled STEPLADDERS AND RELATED METHODS filed Mar. 2, 2010), the disclosure of which is incorporated by reference herein in its entirety. It is noted, as described with respect to other embodiments below, that both rail assemblies need not be pivotally coupled with the top cap. Additionally, in some embodiments, the second assembly 108 may include only a single rail if desired. Other examples of stepladders and top caps are described in U.S. patent application Ser. No. 14/496,987 entitled STEP LADDERS, COMPONENTS FOR STEP LADDERS AND RELATED METHODS, filed Sep. 25, 2014, claiming priority to U.S. Provisional Application 62/045,979, filed Sep. 4, 2014, entitled STEP LADDERS, the disclosures of which are incorporated by reference herein in their entireties.

Referring now to FIGS. 2-5, a rung assembly 106A is shown in accordance with an embodiment of the disclosure. The rung assembly 106A includes a base member 140 that is configured for substantially rigid coupling with the rails 104 of the first assembly 102 of a ladder 100. In the embodiment shown, the base member 140 includes a front wall 142, a rear wall 144, and an upper wall 146 extending between and coupled with the front and rear walls 142 and 144. In the embodiment shown, the various walls 142, 144 and 146 are formed as an integral unit (e.g., welding, brazing, adhesive, mechanical fasteners, etc.). The upper wall 146 may or may not include traction features (e.g., ridges and grooves) such as are often found in conventional ladder rungs.

A groove 148 is formed at, and extends along, the front edge of the upper wall 146. The groove 148 may be positioned directly between the upper wall 146 and the front wall 142. In other embodiments, the groove 148 may be formed wholly in the upper wall 146 or wholly in the front wall 142. In other embodiments, rather than a single continuous groove 148 that extends substantially the entire width (i.e., extending between the rails 104 when attached to a ladder) of the base member 140, one or more grooves of shorter dimension may extend partially along the width of the base member 140. In yet other embodiments, it is noted that the groove 148 could be located along the rear edge of the upper wall 146, reversing the pivoting action of the displaceable member 150 which is described further below.

As just noted, the assembly 106A further includes a displaceable member 150 that is coupled with the base member 140. In the embodiment shown in FIGS. 2-5, the displaceable member includes an upper wall or tread portion 152, which may include one or more traction features 154 (e.g., ridges and grooves). The displaceable member 150 may include a rear wall 156 that is configured to extend to, or beyond, the juncture of the rear wall 144 and upper wall 146 of the base member 140. During actuation of the assembly 106A, the rear wall 156 of the displaceable member may help to prevent the inadvertent pinching of a user's body, the catching of clothing or the entrance of foreign objects between the displaceable member 150 and the base 140.

Figure 4:
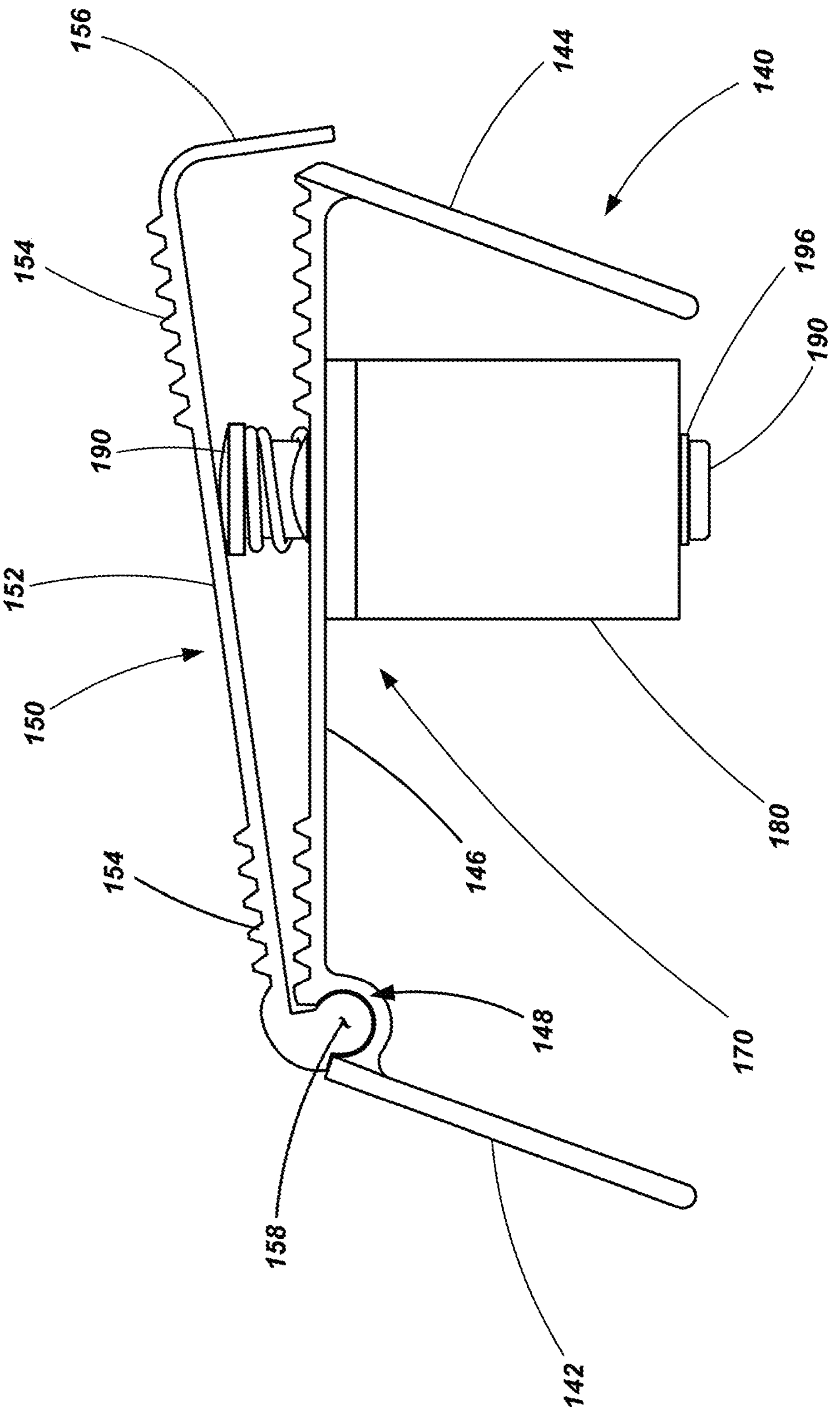
FIG. 4 is a side view of the rung assembly of FIG. 2 while in a first state.
Figure 5:
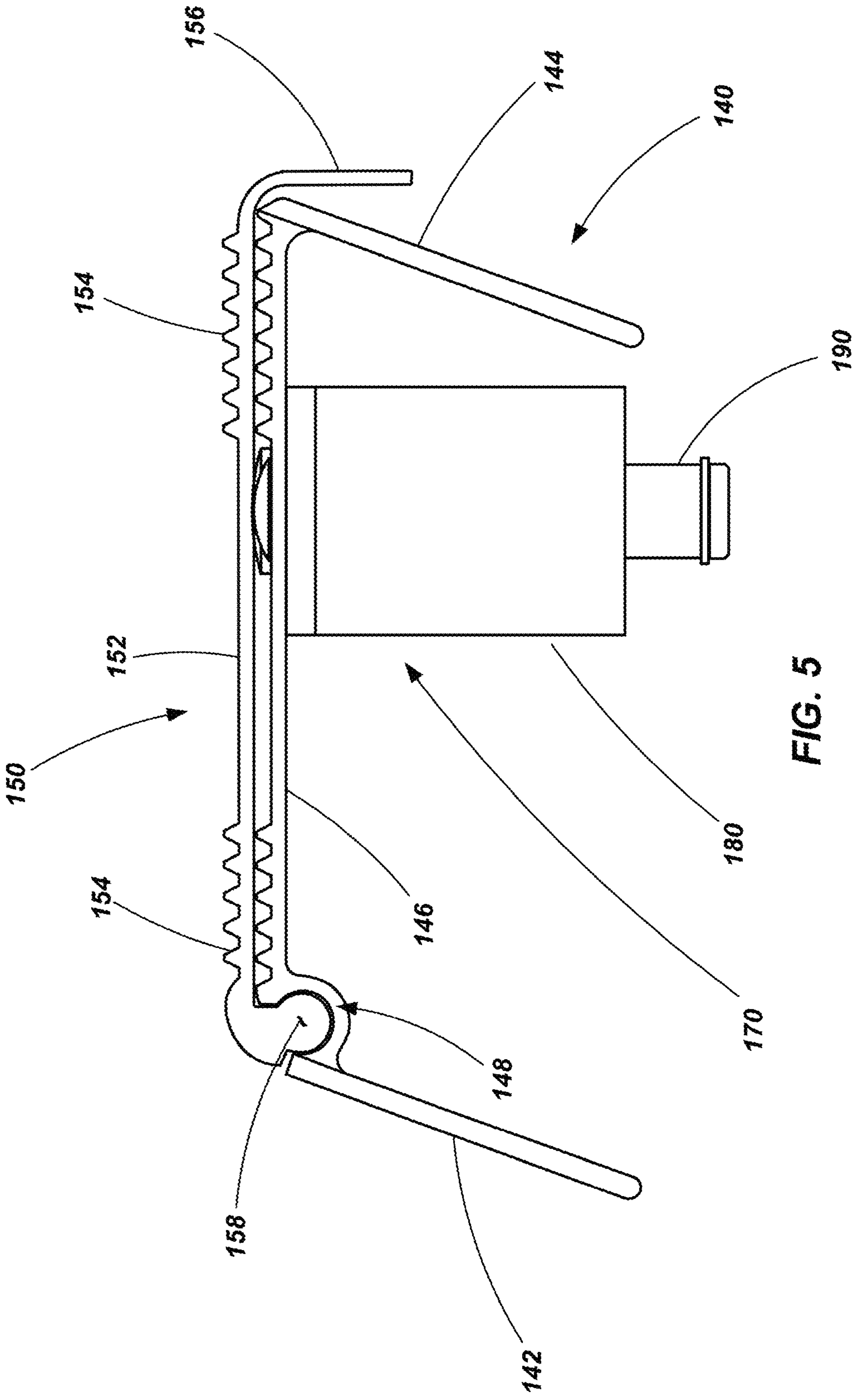
FIG. 5 is a side view of the rung assembly if FIG. 2 while in a second state.

The displaceable member 150 may also include a pivot member 158 (or multiple pivot members) disposed within the groove 148 of the base member 140. The pivot member 158 may include, for example, an elongated member having a portion thereof that is substantially cylindrical, the pivot member 158 being configured to substantially conform in size and shape with the groove 148. As seen by comparing FIGS. 4 and 5, the pivot member 158 enables pivoting of the displaceable member 150 relative to the fixed base 140 about an axis extending generally along the front edge of the rung assembly 106A (e.g., along or adjacent an edge where the front wall 142 meets the upper wall 146 of the base 140) and extending between the rails 104 of the ladder 100. The "unactuated" or "normal" state of the rung assembly is shown in FIG. 4, with the displaceable member 150 positioned so that its tread portion or upper wall 152 is at an acute angle relative to the upper wall 146 of the base member 140. As shown in FIG. 5, when actuated (e.g., when a user is standing on the rung assembly), the upper wall 154 of the displaceable member is pivoted such that it is positioned against and substantially parallel with the upper wall 146 of the base member 140.

The rung assembly 106A further includes one or more alert mechanisms 170 that, when actuated by displacement of the displaceable member 150 a desired distance (e.g., from the position in FIG. 4 to the position in FIG. 5), provides an alert to the user (e.g., by audible noise) informing them that they have stepped on the rung assembly 106A. Thus, for example, when the rung assembly 106A is placed as the lowermost rung of a ladder (e.g., as shown in FIG. 1), the alert mechanism 170 provides a user with information, as they descend, that they have reached the lowermost rung and that their next step downward will be to the ground or other surface supporting the ladder 100.

Referring to FIGS. 6-9, the alert mechanism 170 is shown in accordance with an embodiment of the present disclosure. The alert mechanism 170 includes a housing member or a bracket 180 having flange portions of 181 for coupling with the upper wall 146 of the base member 140. The bracket 180 includes two walls 182 and 184, each having an opening 186 and 188 formed therein. A pin member 190 extends through the openings 186 and 188. The pin member 190 includes a shoulder 192 formed along an upper portion thereof and sized to be wider than the opening 186 formed in the upper wall 182. The shoulder 192 abuts a biasing member 194 (e.g., a coiled spring or other member) positioned about the pin member 190 between the upper wall 184 and the shoulder 192. The shoulder 192 cooperates with the biasing member 194 to retain the pin member 186 within the bracket 180 and also biases the pin 190 upwards relative to the bracket 180.

A retainer 196 may be coupled to a lower end of the pin member 190 (e.g., a c-clip or snap ring disposed in a groove 198 formed in the pin member) and be configured to abut the lower wall 184 (when displaced towards the lower wall) and retain the pin member 190 within the bracket 180. A sleeve or collar 200 is slidably positioned about the pin member 190 between the upper and lower walls 182 and 184. A biasing member 202 is positioned about the pin member 190 and located between the collar 200 and the lower wall 184 of the bracket 180 and biases the collar upwards toward the upper wall 182. A detent mechanism 204 (FIGS. 7-9) or other retaining mechanism is associated with the pin member 190 and collar 200 to retain the collar 200 at a desired location on the pin member 190 until a force of a specified magnitude is applied against the collar 200, causing the collar 200 to slide along the pin member 190 as will be described in further detail below. The detent mechanism 204 may include, for example, a biasing member 206 (e.g., a coiled spring) disposed in a through hole 208 formed in the pin member 190. A pair of ball members 210 may be positioned on each side of the biasing member 206 so as to partially protrude from the through hole 208. A groove 212, which may correspond generally in size to conform with the radius of the ball members 210, may be formed on the internal surface of the collar 200 such that when the groove 212 is aligned with the ball members 210, the ball members are displaced so as to be partially in the groove 212 and partially in the through hole 208, holding the collar 200 in place relative to the pin member 190. The collar 200 remains in the held position relative to the pin member 190 until a force is applied to the collar 200 that is sufficient to overcome the force applied by the biasing member 206 of the detent mechanism 204 (and any friction forces between the ball members 208 and groove of the collar 200), causing the ball members 210 to retract within the through hole 208 and enabling the collar 200 to slide along the length of the pin member 190.

Figure 2:
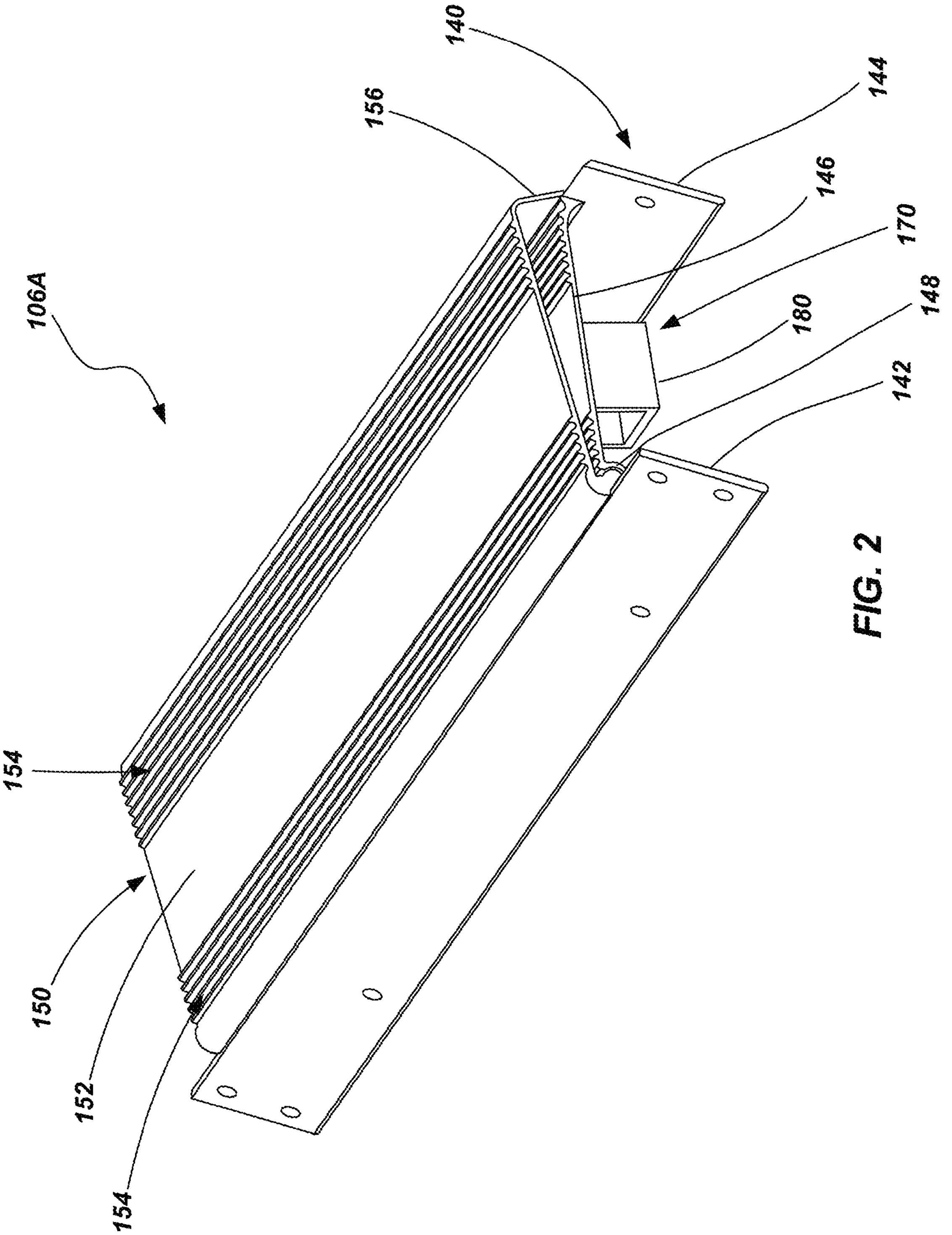
FIG. 2 is a perspective view of a rung assembly according to an embodiment of the present disclosure.
Figure 3:
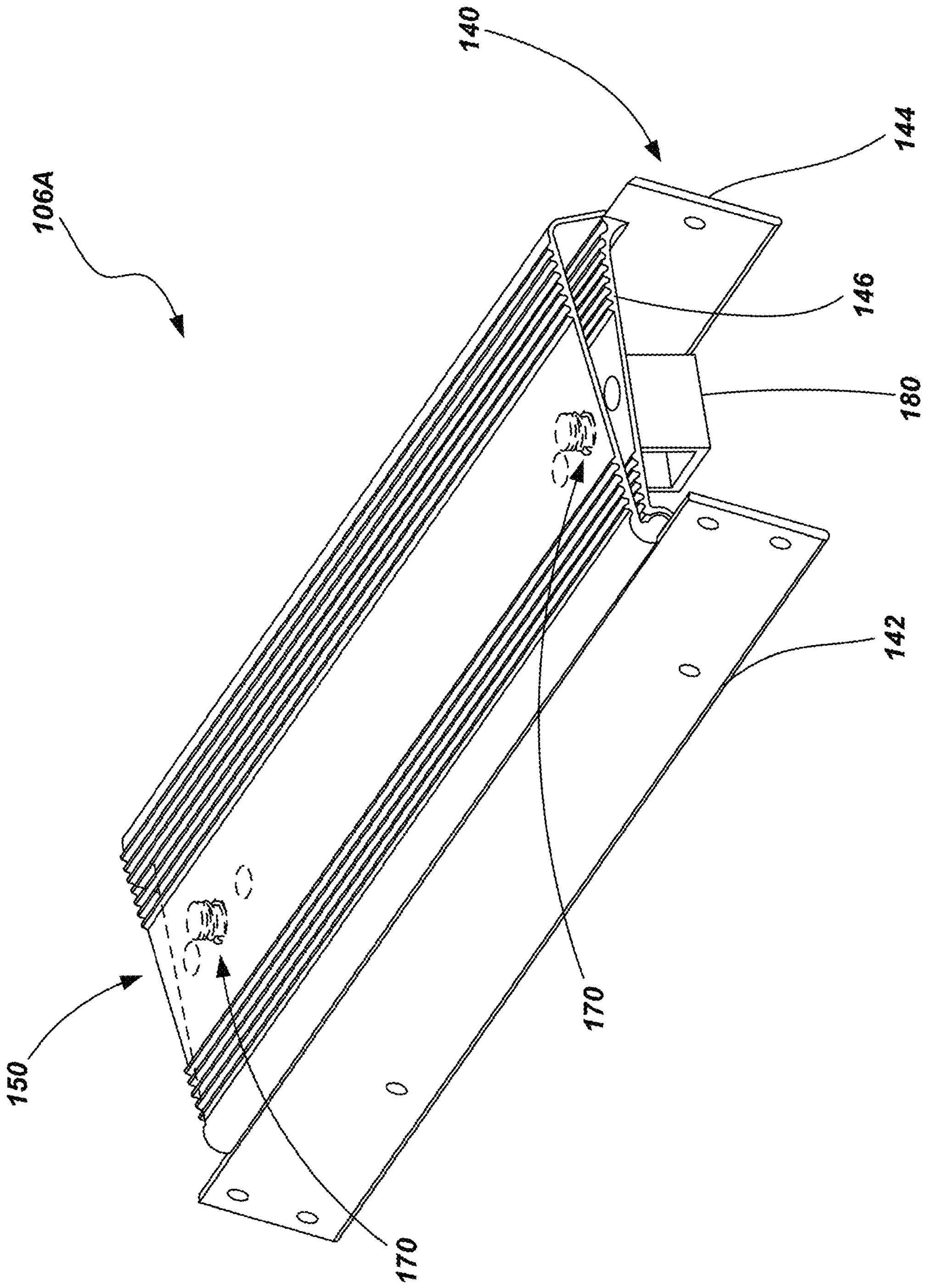
FIG. 3 is a perspective view of the rung assembly of FIG. 2, showing a hidden portion of the rung assembly.
Figure 6:
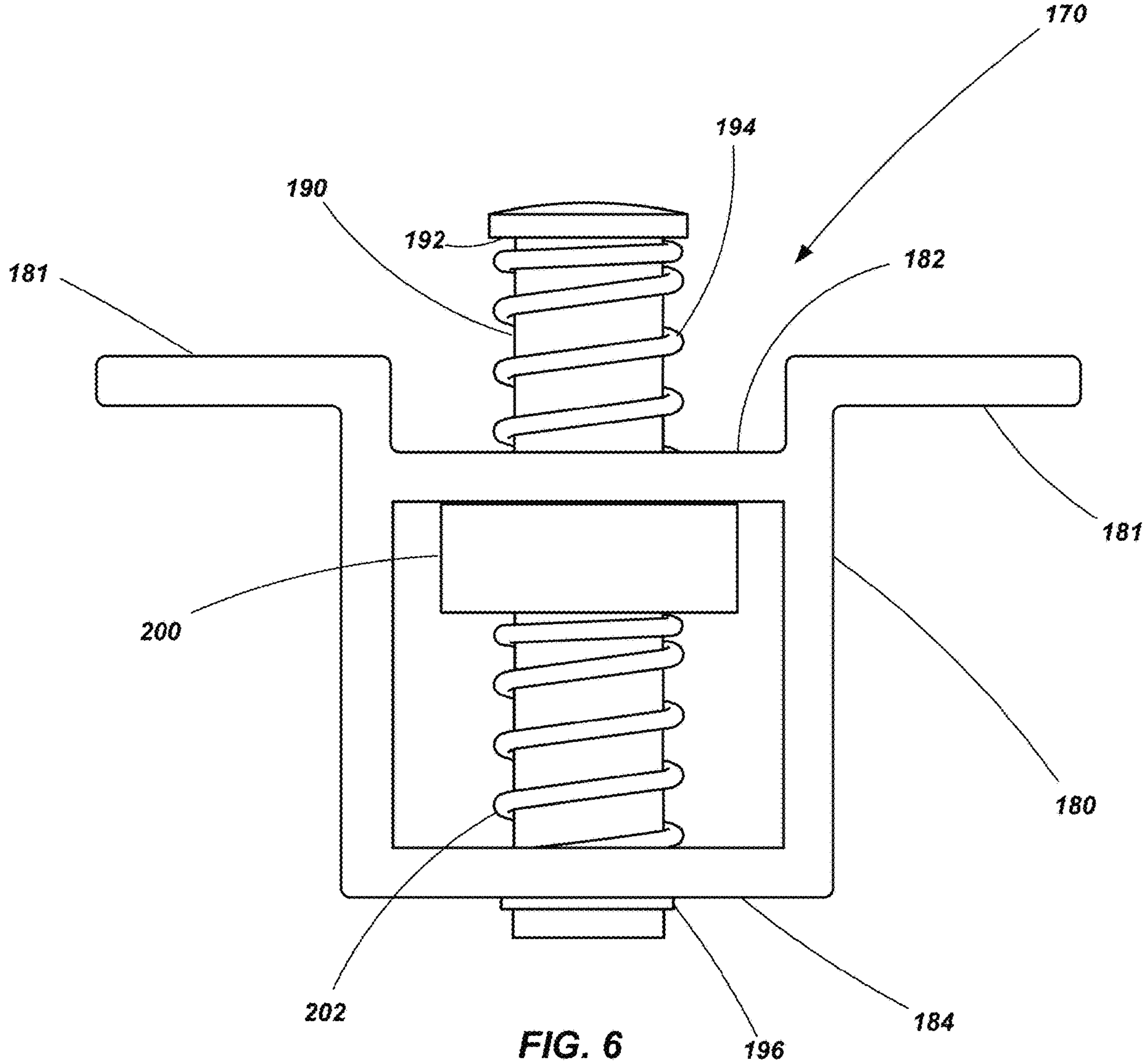
FIG. 6 is a side view of an audible alert mechanism in a first state as may be used in a rung assembly according to an embodiment of the present disclosure.
Figure 7:
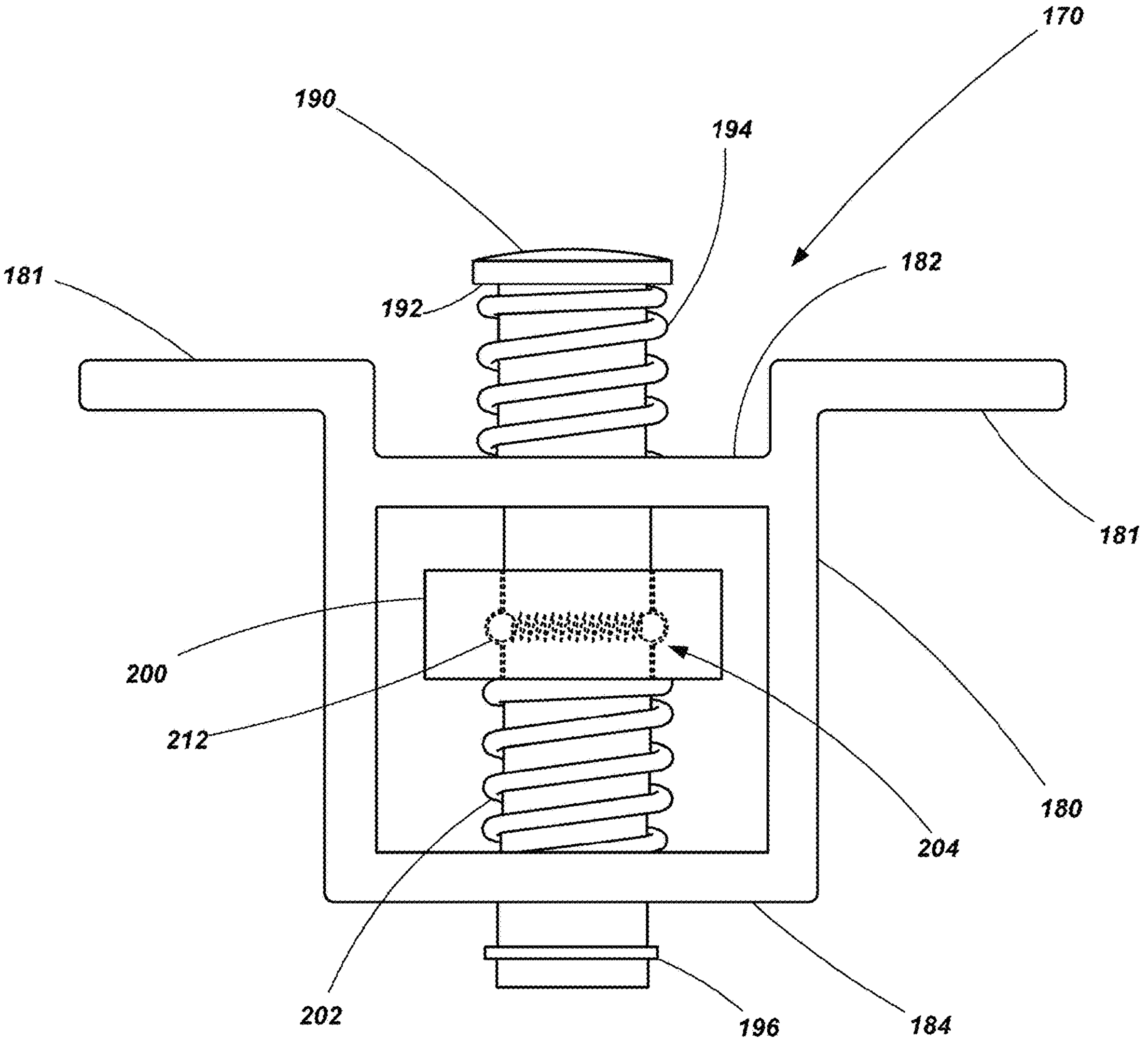
FIG. 7 is a side view of the mechanism shown in FIG. 6 while in a second state.
Figure 8:
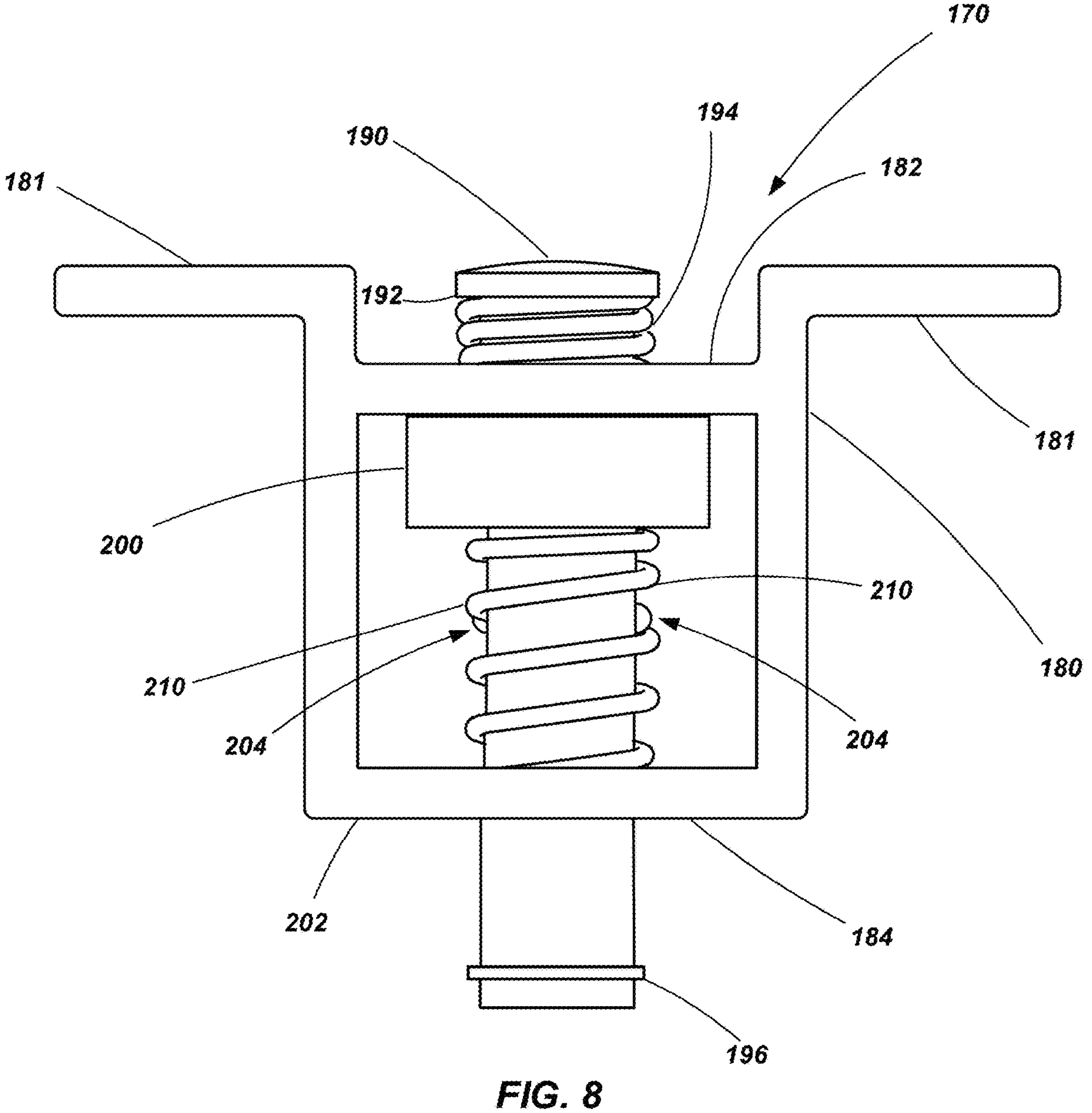
FIG. 8 is a side view of the mechanism shown in FIG. 6 while in a third state.
Figure 9:
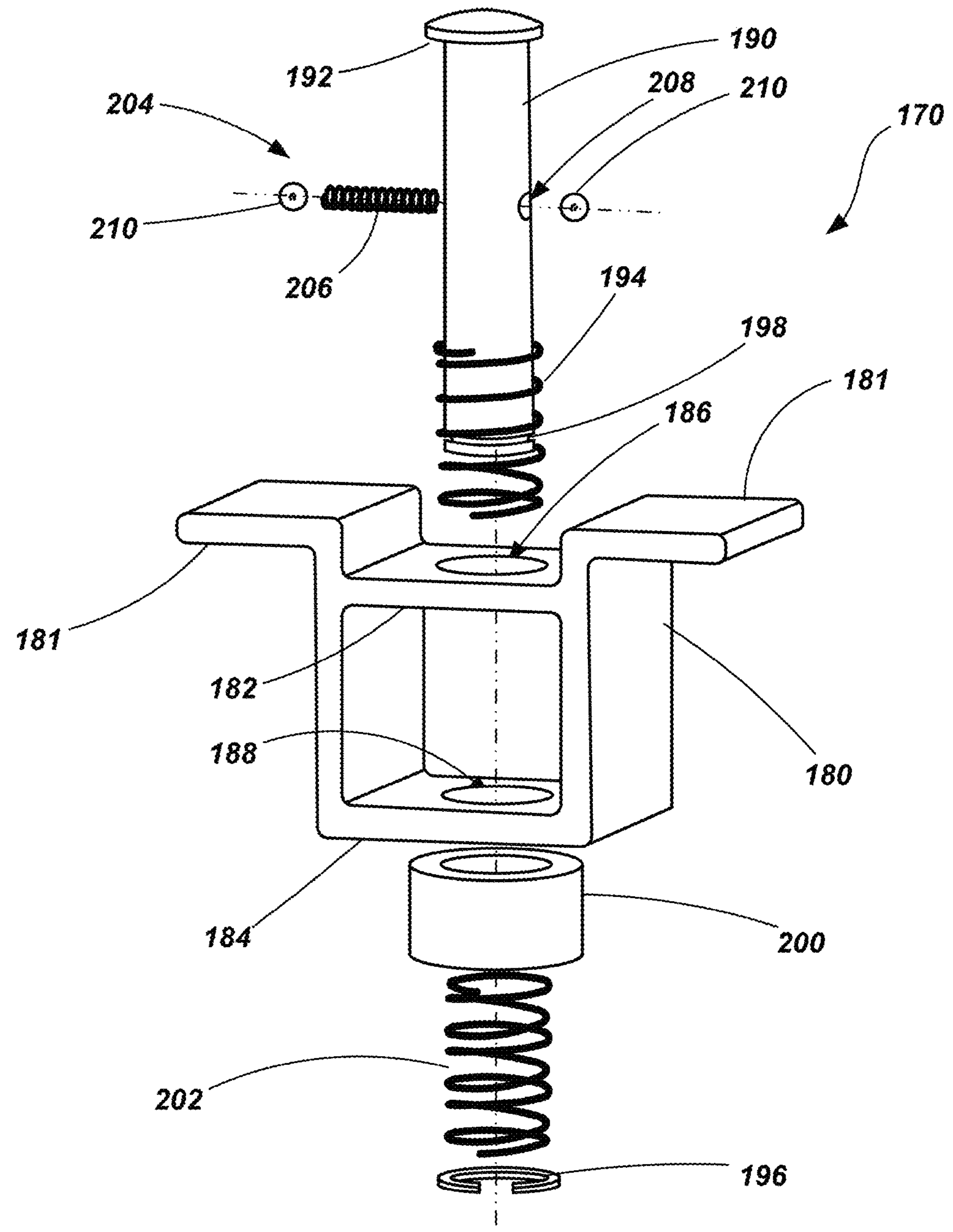
FIG. 9 is an exploded view of the mechanism shown in FIG. 6.
Figure 10:
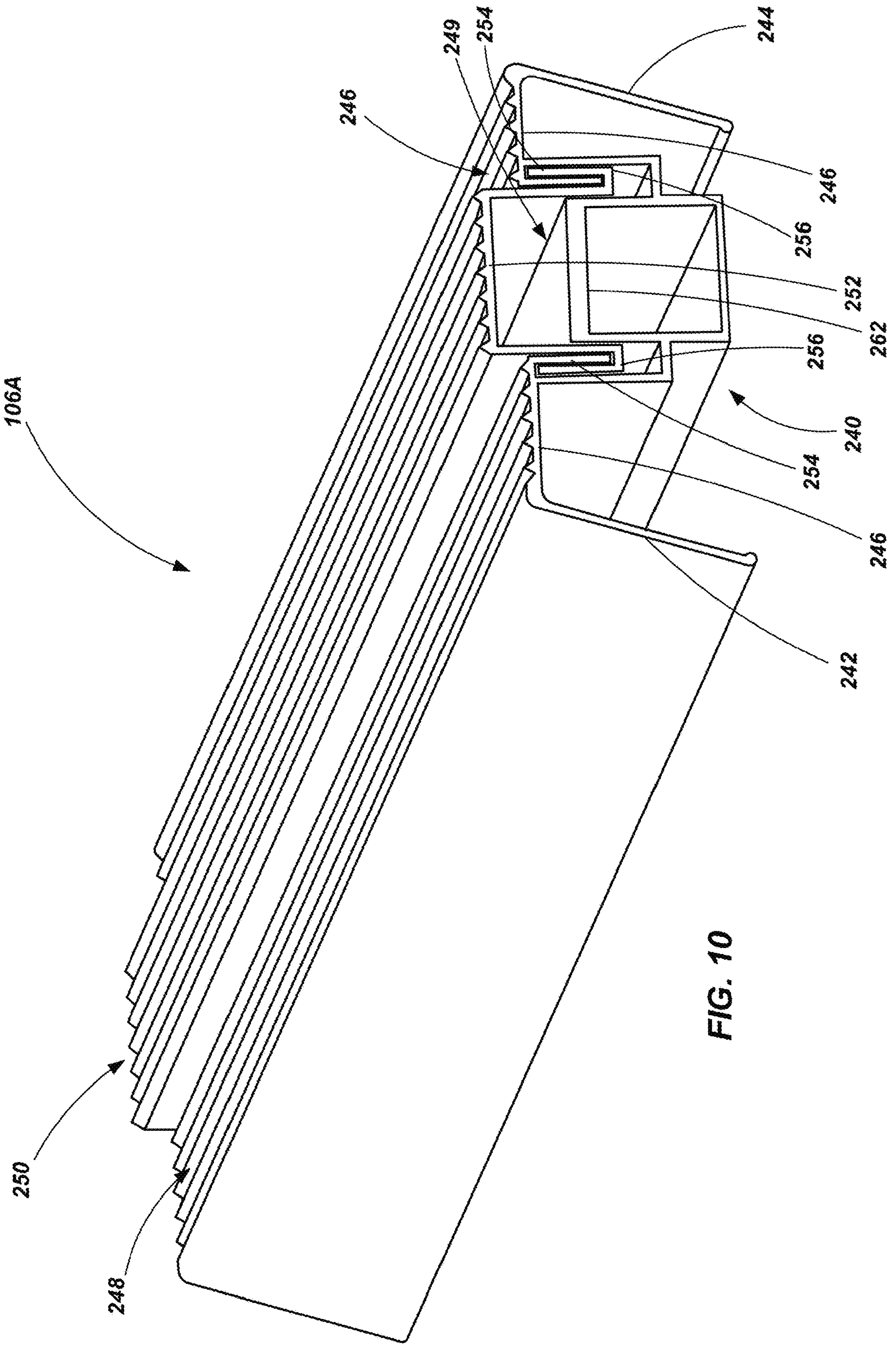
FIG. 10 is a top perspective view of a rung assembly according to another embodiment of the present disclosure.
Figure 11:
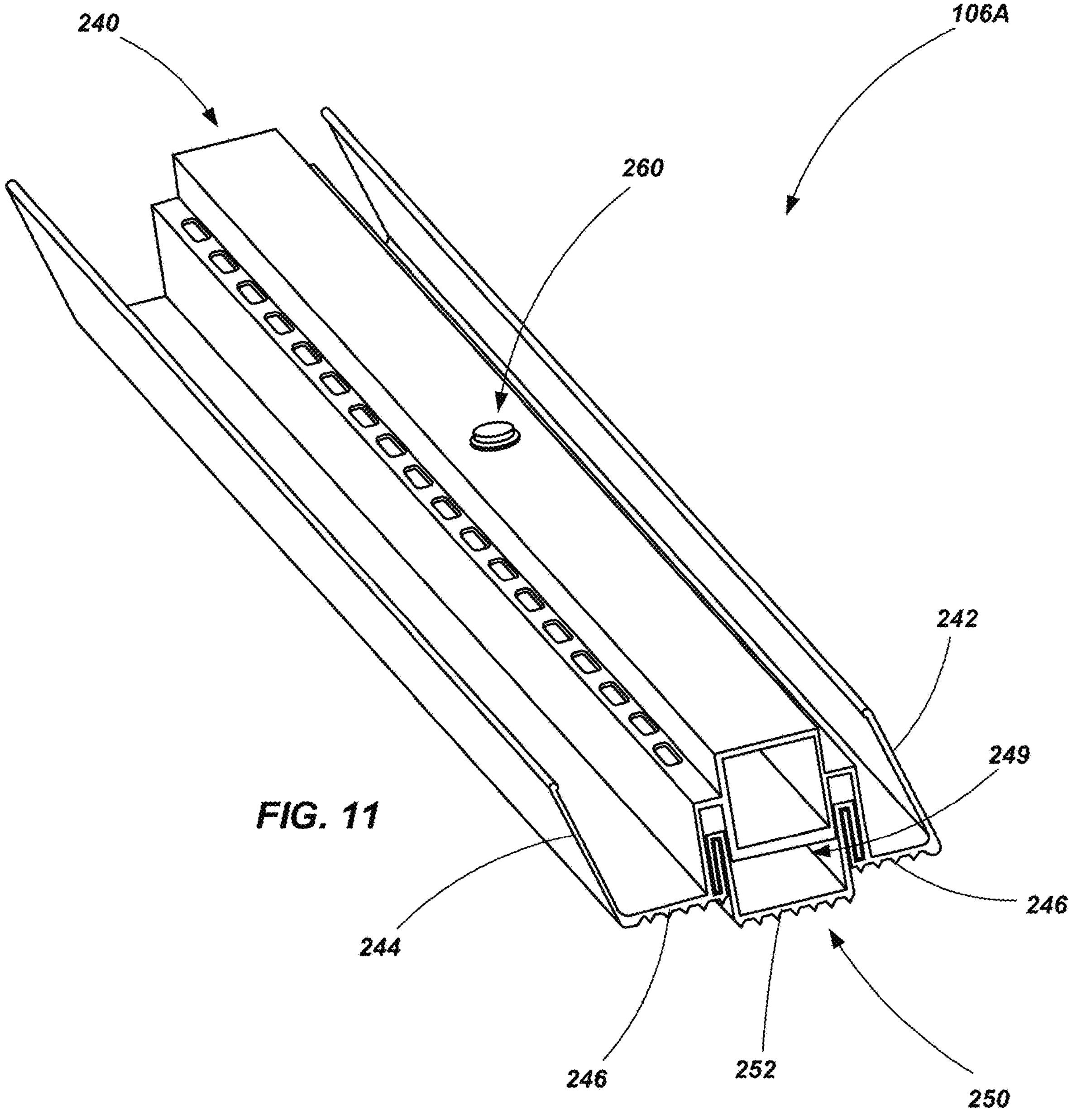
FIG. 11 is a bottom perspective view of the rung assembly shown in FIG. 10.
Figure 12:
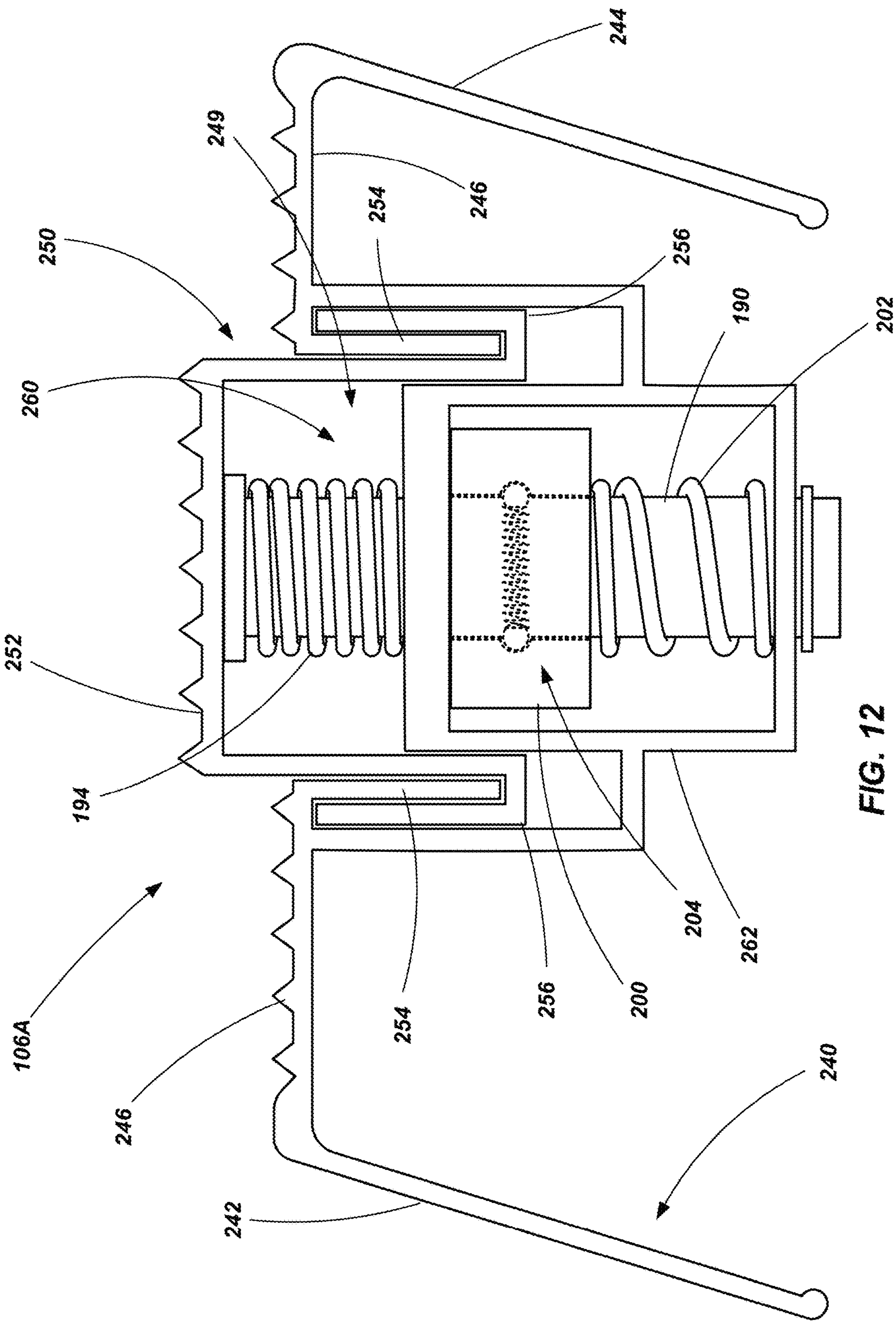
FIG. 12 is a side view of the rung assembly shown in FIG. 10.
Figure 13:
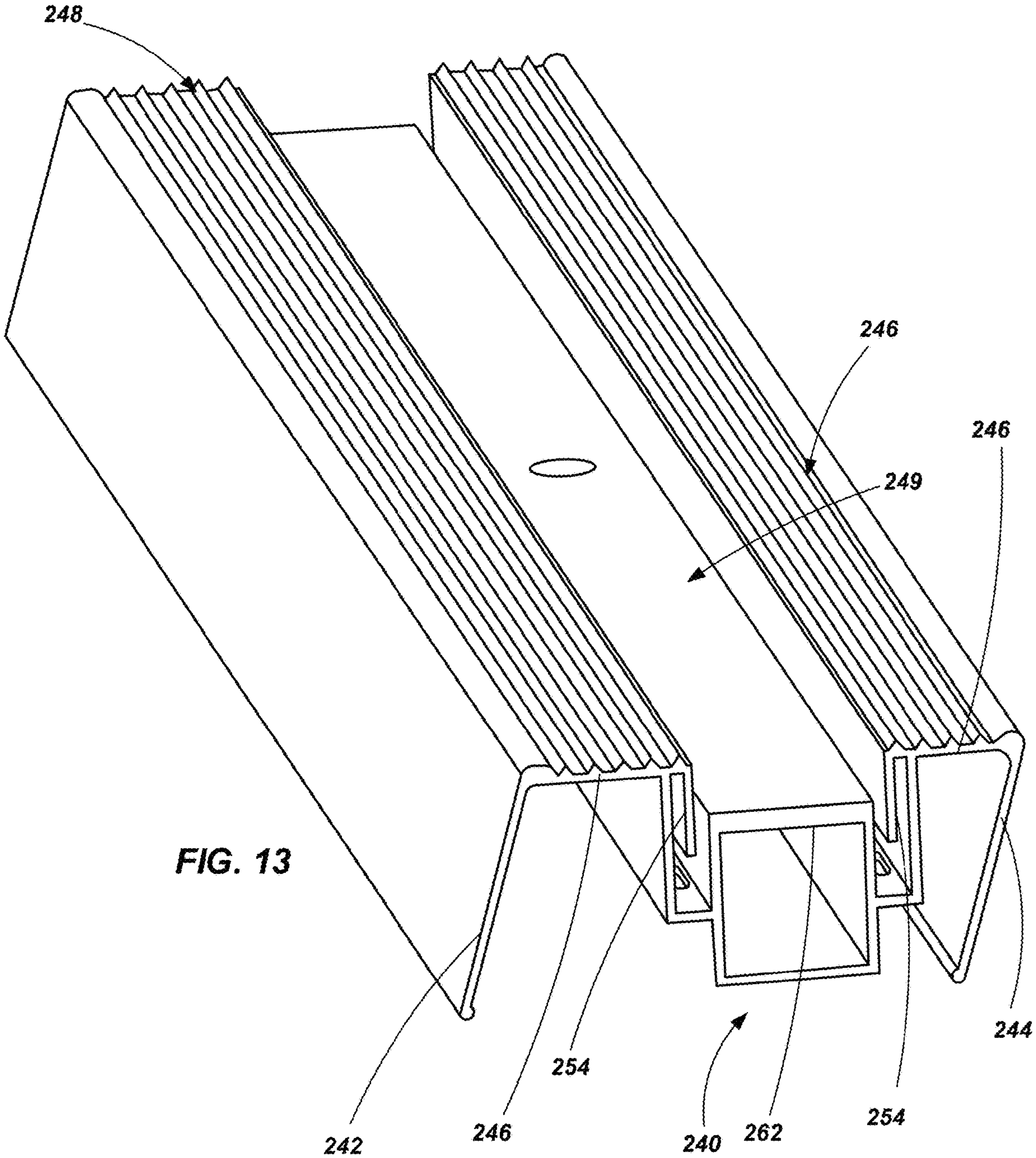
FIG. 13 is a top perspective view of a base member of the rung assembly shown in FIG. 10.

Thus, in operation, when no force is applied to the alert mechanism (beyond the weight of the displaceable member 150), the alert mechanism 170 is in the state as shown in FIG. 6 and the rung assembly 106A is in the state as shown in FIGS. 2-4. However, when a user steps on the rung assembly 106A, their weight causes the pin member 190 to be placed downwards (via the pressure applied to the displaceable member 150) as indicated in FIG. 7. This causes the upper biasing member 194 to be compressed between the shoulder 192 and the upper wall 182. Additionally, the detent mechanism 204 holds the collar 200 in position relative to the pin 190 such that the collar 200 is displaced along with the pin member 190 and compresses the lower biasing member 202. As the lower biasing member 202 becomes compressed, the force that it exerts against the collar 200 increases until, when a force of sufficient magnitude is reached, the force of the biasing member 202 overcomes the holding capacity of the detent mechanism 204, causing the collar 200 to be displaced upwards relative to the pin member 190 until it abuts the upper wall 182 as seen in FIG. 8. This is the "actuated" state of the alert mechanism 170 and the rung assembly 106A (as shown in FIG. 5). When the collar 200 is released (i.e., the detent mechanism 204 releases its hold on the collar 200), the lower biasing member 202 causes the collar 200 to slap or smack against the upper wall 182 creating a substantial audible event, alerting the user to the fact that they are standing on the rung assembly 106A. In certain embodiments, the slap or smack of the collar 200 against the upper wall 182 may be of sufficient force to also be felt by a user in addition to being heard.

When a user steps off of the rung assembly 106A, the upper biasing member causes the pin member 190 to be displaced upward, causing the displaceable member 150 to be displaced upward (see FIGS. 2, 4 and 6), resetting the detent mechanism 204 within the groove of the collar 200, again holding the collar 200 on the pin member 190 as shown in FIG. 6. It is noted that two alert mechanisms 170 are shown in FIG. 3 in association with the described embodiment. However, in other embodiments, a single alert mechanism 170 may be used or more than two alert mechanisms may be used.

Referring now to FIGS. 10-13, a rung assembly 106A is shown in accordance with another embodiment of the disclosure. The rung assembly 106A includes a base member 240 that is configured for substantially rigid coupling with the rails 104 of the first assembly 102. In the embodiment shown, the base member 240 includes a front wall 242, a rear wall 244, and an upper wall 246 extending between and coupled with the front and rear walls 242 and 244. The upper wall my include traction features 248 (e.g., ridges and grooves) such as are conventional in traditional ladder rungs. Additionally, the upper wall 246 defines a channel 249 extending across its width.

A displaceable member 250 is disposed within the channel 249 and configured to be displaced between at least two positions. The displaceable member 250 includes an upper wall or surface 252 that may include traction features if desired. The base member 240 and the displaceable member 250 may include interlocking flange members, 254 and 256, respectively. The interlocking flange members 254 and 256 retain the displaceable member 250 within the channel 249 and define a substantially vertical displacement path for the displacement member 250 relative to the base member 240.

The rung assembly 106A shown in FIGS. 10-13 may also include one or more alert mechanisms 260 structured similarly to that which has been described above. For example, a structural portion 262 of the base member 240 may function similar to the housing or bracket 170 described above (e.g., as an integrated bracket or housing). Additionally, the alert mechanism 260 may include a pin member 190 extending through openings of the structural portion 262, biasing members 194 and 202, collar 200 and a detent mechanism (not shown in FIGS. 10-13). The pin member 190 is in abutting contact with the upper wall 252 of the displaceable member 250 so as to be actuated upon displacement of the displaceable member 250.

The alert mechanism 260 functions substantially similar to that described above with respect to the embodiment shown in FIGS. 6-9. when a user steps on the rung assembly 106A, the displaceable member 250 is displaced downwards into the channel 249 until its upper surface is substantially flush or coplanar with the upper surface 246 of the base member 240. Displacement of the displaceable member 250 causes the pin member 190 to also be displaced downward. The collar 200 is displaced with the pin member 190 until forces of the associated detent mechanism 204 are overcome, causing the collar 200 to be displaced upwards and slap against a surface of the structural portion 262 of the base member 240, alerting a user to the fact that they just stepped on the rung assembly 106A.

Figure 14:
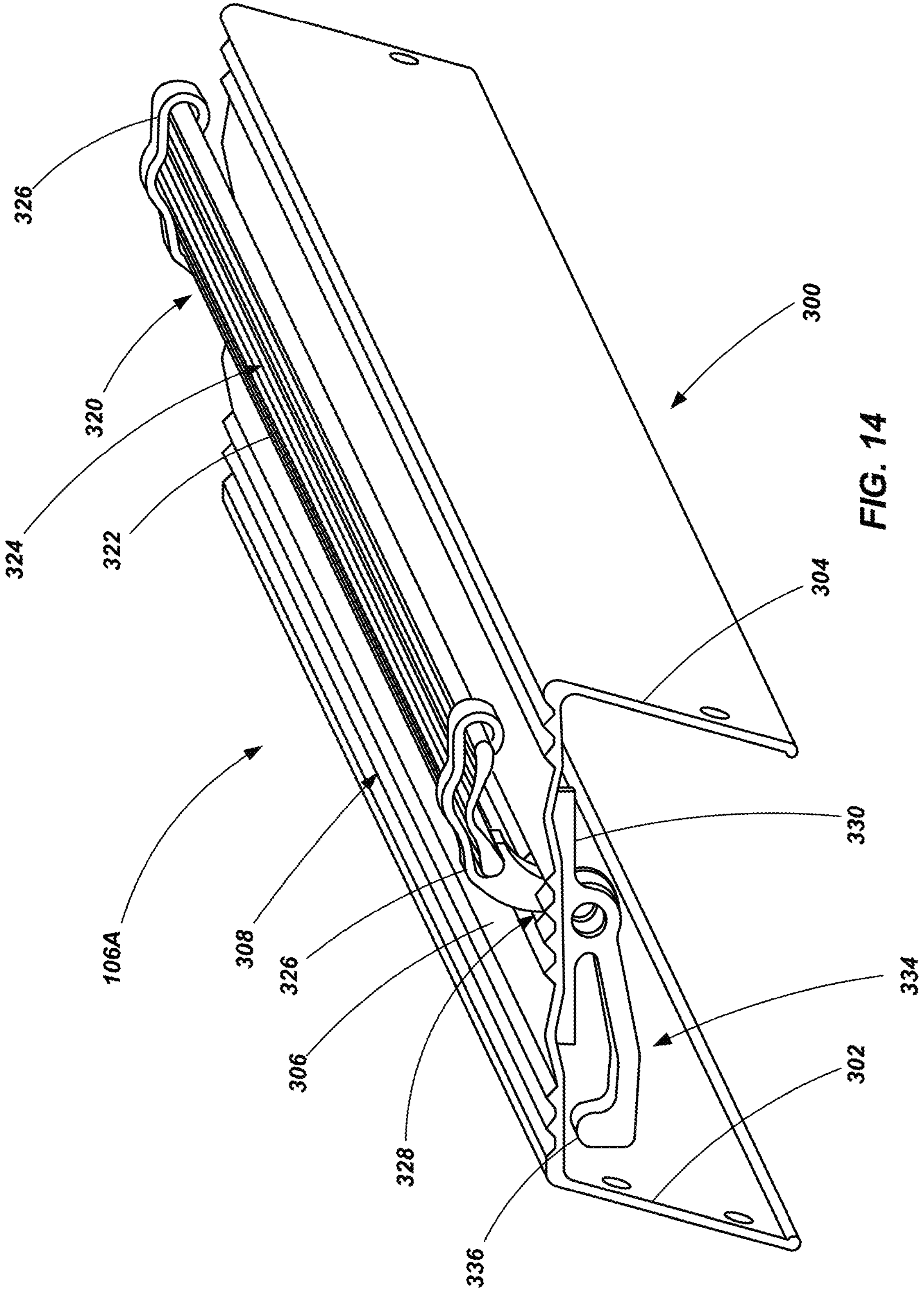
FIG. 14 is a perspective view of a rung assembly according to another embodiment of the present disclosure.
Figure 15:
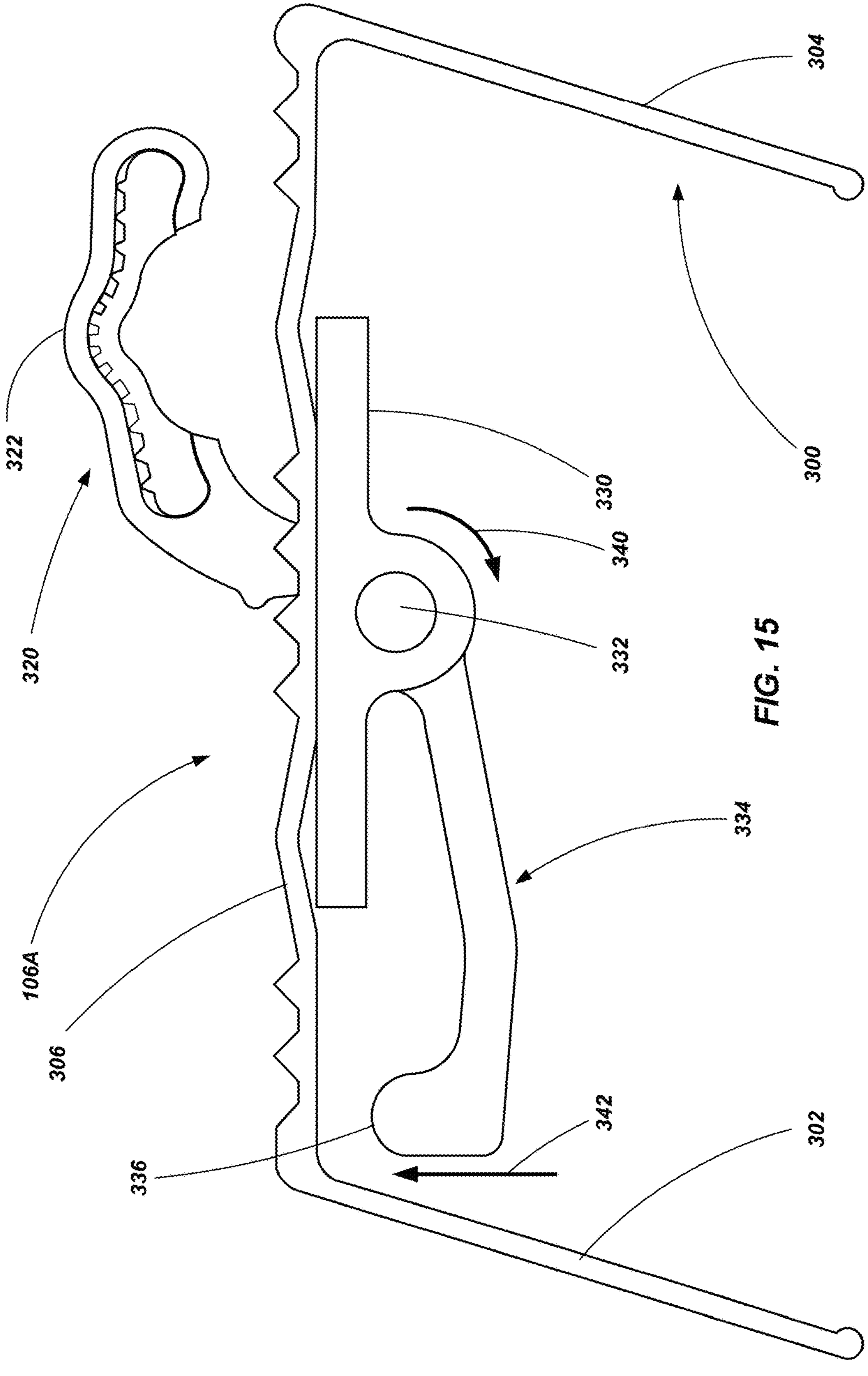
FIG. 15 is a side view of the rung assembly shown in FIG. 14.
Figure 16:
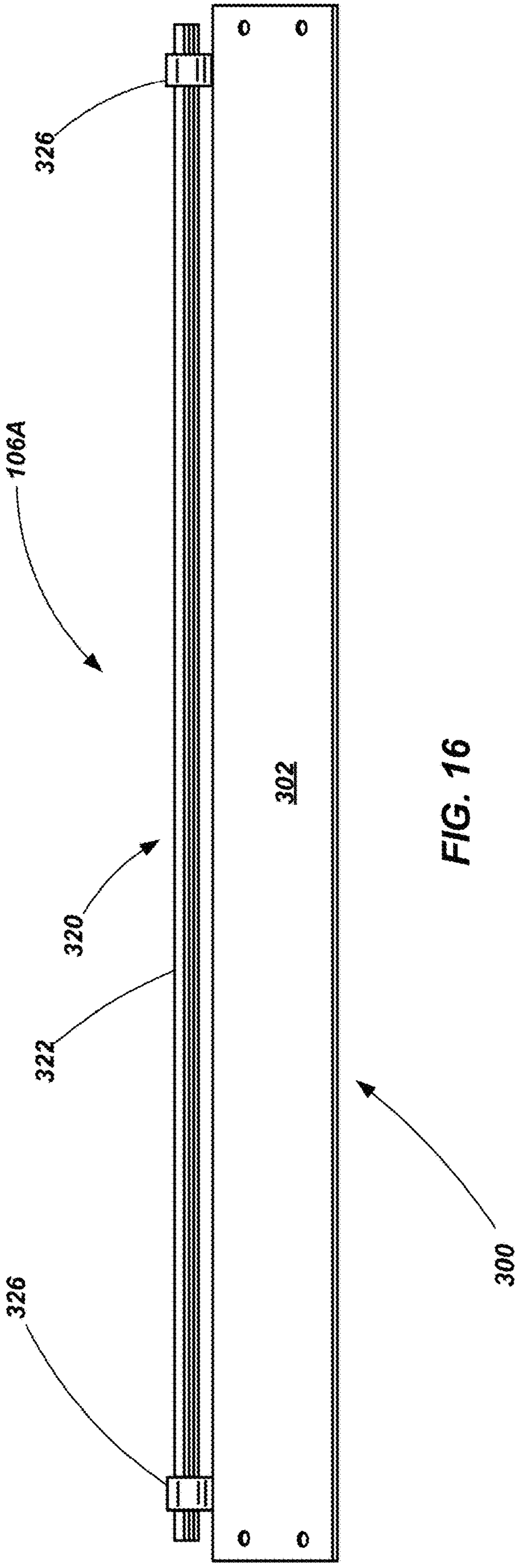
FIG. 16 is a front view of the rung assembly shown in FIG. 14.

Referring to FIGS. 14-16, a rung assembly 106A according to a further embodiment of the disclosure is shown. The assembly 106A includes a base member 300 that is configured for substantially rigid coupling with the rails 104 of the first assembly 102. In the embodiment shown, the base member 300 includes a front wall 302, a rear wall 304, and an upper wall 306 extending between and coupled with the front and rear walls 302 and 304. The upper wall 306 may include traction features 308 (e.g., ridges and grooves) such as are often found in conventional ladder rungs.

A displaceable member 320 includes an upper surface 322 or a tread member, which may include traction features 324, positioned above the upper wall 306 of the base member 300. The upper surface 322 is coupled to two side arms 326. The side arms 326 extend through openings 328 formed in the upper wall 306 of the base member 300 and are pivotally coupled to the base member 300 by way of a bracket 330 and pivot member 332. A lower portion 334 of the side arms 326 extends beneath the upper wall 306 of the base member 300 and includes a striking portion 336. When a user steps on the rung assembly 106A shown in FIGS. 14-16, the weight of the user causes the tread or upper surface 322 of the displaceable member 320 to be displaced downward toward the upper wall 306 of the base member 300. With the tread 322 being displaced downward, the side arms 326 pivot relative to the base member 300, as indicated by the directional arrow 340 (FIG. 15). When the side arms 326 pivot as indicated by direction arrow 340 (FIG. 15), the lower portion 334 of the side arms 326 are displaced upwards, as indicated by directional arrow 342, causing the striking portion to strike the upper wall 306 of the base member and create a knocking or ringing sound as an alert to the user that they have stepped on the rung assembly 106A. Thus, the pivotal side arms function as the alert mechanism in the embodiment shown in FIGS. 14-16. The displaceable member 320 may return to its unactuated position after a user steps off of the rung assembly due to gravity (e.g., a weight associated with the lower portions of the side arms 326) or by way of a biasing member (not shown) associated with the side arms 326 or the treat 322.

In any of the embodiments described above, when a user stands on the rung assembly 106A (which, in the embodiment shown in FIG. 1 is the lowermost rung of the ladder), they will be alerted by an audible alarm, and in some embodiments, by force feedback (e.g., such as feeling a small slap or knock of the rung from the alert mechanism),—as well as by sensing that there is a different "feel" when standing on the rung assembly as compared to other rungs of the ladder—that they are standing on the lowermost "rung" and recognize that they are only one rung or step above the ground. It is noted that the different "feel" when standing on the rung assembly, event after the alert mechanism has been actuated, may take various different forms. For example, the embodiment described with respect to FIGS. 1-5 may include the tread portion residing at a slight angle as compared to other rungs, or it may have a slight rocking feel to it as it rests on the pin members of the alert mechanisms. In another example, in an embodiment associated with that shown in FIGS. 10-13, the displaceable member may be configured to protrude slightly from the base member when in the second or actuated position giving a slight "uneven" feel across the surface of the rung. Similarly, in the embodiment shown in FIGS. 14-16, a user will send a slight unevenness in the rung as the displaceable member will rest atop the base member when in the actuated position.

It is noted that in other embodiments, the rung assembly may not be located as the lowermost rung of the ladder. For example, it may be located as the second lowermost rung of the ladder, indicating to the user that they still have one more rung to descend prior to reaching the ground.

One advantage shared by all of the above embodiments described herein, is that the front edge of the rung assembly is not substantially displaced in elevation between the unactuated and actuated states. This includes the embodiment shown in FIGS. 1-5 where the front edge may pivot, but is not substantially displaced in terms of elevation. This provides a positive position of the front edge of the rungs (relative to other components of the ladder, such as the side rails), maintaining the distance between adjacent rungs at their front edges so that the user feels confident as they engage each rung and/or rung assembly. Stated another way, the side front edge of the rung assembly remains at a substantially fixed location on the ladder, even though other components of the rung assembly may be displaced or more relative to, for example, the side rails.

Of course, the specific embodiments described herein are merely examples and a variety of ladder configurations may be used in conjunction with the present disclosure. While specifically described with respect to use in stepladders, the rung assemblies may be used in other types of ladders, including extension ladders and combination ladders, without limitation. For example, non-limiting examples of extension ladders into which a rung assembly of the present disclosure may be incorporated are described in U.S. Pat. No. 8,365,865 (U.S. patent application Ser. No. 12/714,313 filed on Feb. 26, 2010) entitled ADJUSTABLE LADDERS AND RELATED METHODS, the disclosure of which is incorporated by reference herein in its entirety. Additionally, non-limiting examples of articulating ladders (sometimes referred to as combination ladders) into which a rung assembly of the present disclosure may be incorporated are described in U.S. Pat. No. 7,364,017 (U.S. patent application Ser. No. 10/706,308, filed on Nov. 11, 2003) entitled COMBINATION LADDERS, LADDER COMPONENTS AND METHODS OF MANUFACTURING SAME, the disclosure of which is incorporated by reference herein in its entirety.

Figure 17:
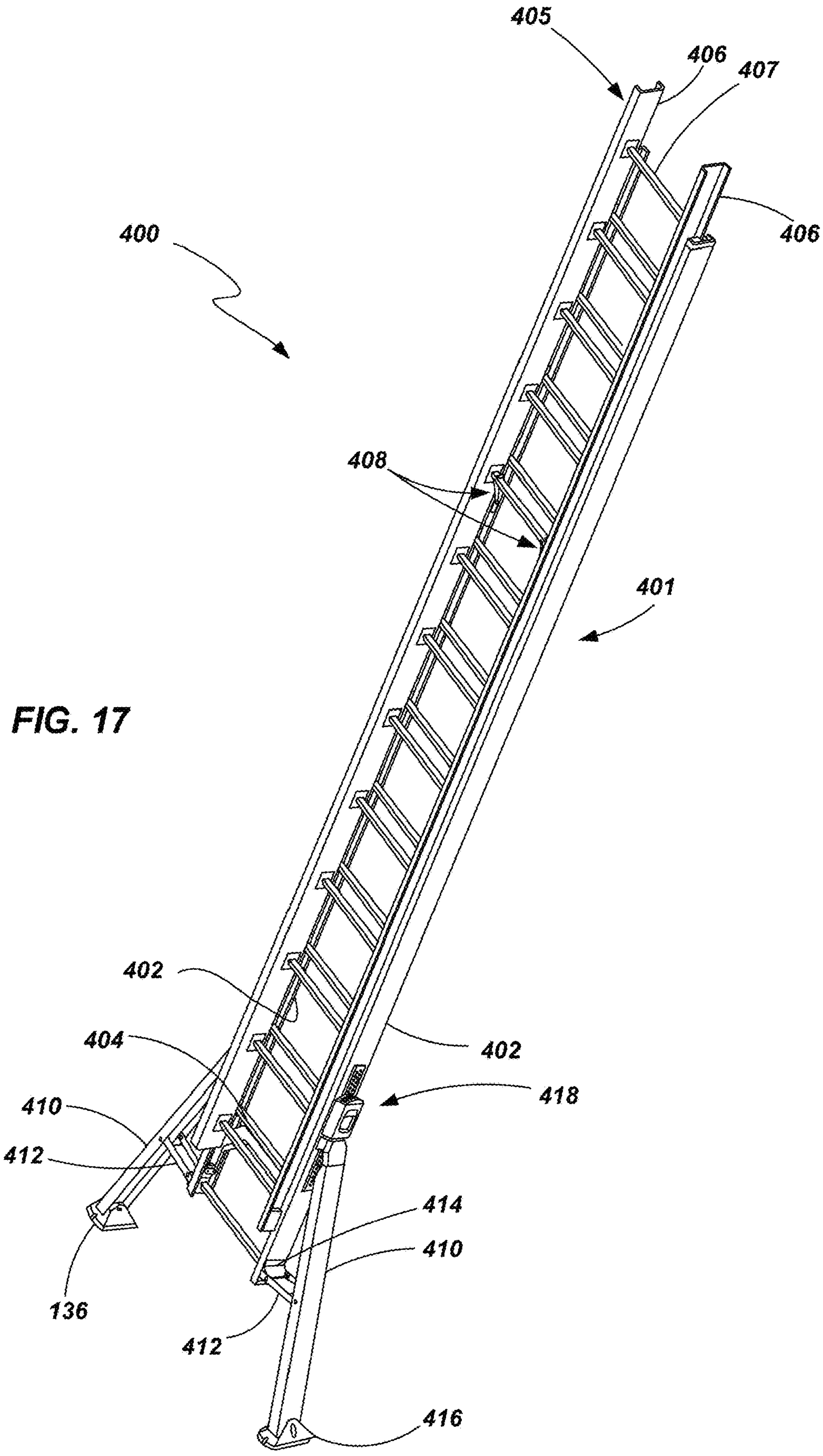
FIG. 17 is a perspective view of another ladder according to an embodiment of the present disclosure.

Rung assemblies may also be used with ladders such as straight ladders and extension ladders. For example, referring to FIGS. 17 and 18, a rung assembly 106A may be incorporated with an extension ladder 400. The extension ladder 400 may include a first assembly 401 having a first pair of rails 402 and a plurality of rungs 404 extending between and coupled to the rails 402. The extension ladder 400 may also include a second assembly 405 having a second pair of rails 406 and a plurality of rungs 407 extending between and coupled to the rails 406. The second pair of rails 406 may be slidably coupled with the first pair of rails 402 and an adjustment mechanism 408 may be used to selectively maintain and adjust the second assembly 405 relative to the first assembly 401.

In some embodiments, the ladder 400 may include adjustable legs 410 positioned along the lower portion of each of the first pair of rails 402. A swing-arm 412 may be pivotally coupled to an associated rail 402 (e.g., by way of a bracket 414) and also pivotally coupled to a portion of an associated adjustable leg 410. A foot 416 may be coupled to the lower end of each leg 410 to support the ladder 400 on the ground or other surface. In some embodiments, the feet 416 may be configured to be selectively adapted for use on an interior surface (e.g., the floor of a building) or on a surface such as the ground. For example, the feet 416 may be pivotal relative to the leg 410 so as to have different portions of each foot 416 engage the supporting surface as selected by the user. In some embodiments, the ladder may not include adjustable legs, and the feet 416 may be coupled direction to the rails 402.

The adjustable legs 410 may be configured so that a first end is hingedly coupled with an adjustment mechanism 418 which, in turn, may be slidably coupled with the rails 402 of the ladder 400. In some embodiments, the adjustment mechanism enables the upper end of the adjustable legs 410 to be selectively positioned along a portion of the length of its associated rail 402. When the upper portion of the adjustable leg 410 is displaced relative to its associated rail 402, the lower portion of the leg 410, including its foot 416, swings laterally inward or outward due to the arrangement of the swing-arm 412 coupled between the leg 410 and the rail 402. Examples of adjustable legs 410 and adjustment mechanisms are described in U.S. Patent Application Publication No. US20180094488, published Apr. 5, 2018, the disclosure of which is incorporated by reference herein in its entirety.

Other examples of extension ladders, adjustable legs, and associated components (e.g., adjustment mechanisms) are described in U.S. Pat. No. 8,365,865, issued Feb. 5, 2013, to Moss et al., U.S. Pat. No. 9,145,733 issued Sep. 29, 2015, Worthington et al., and U.S. Patent Application Publication No 2015/0068842, published on Mar. 12, 2015, the disclosures of which are incorporated by reference herein in the their entireties.

Figure 19:
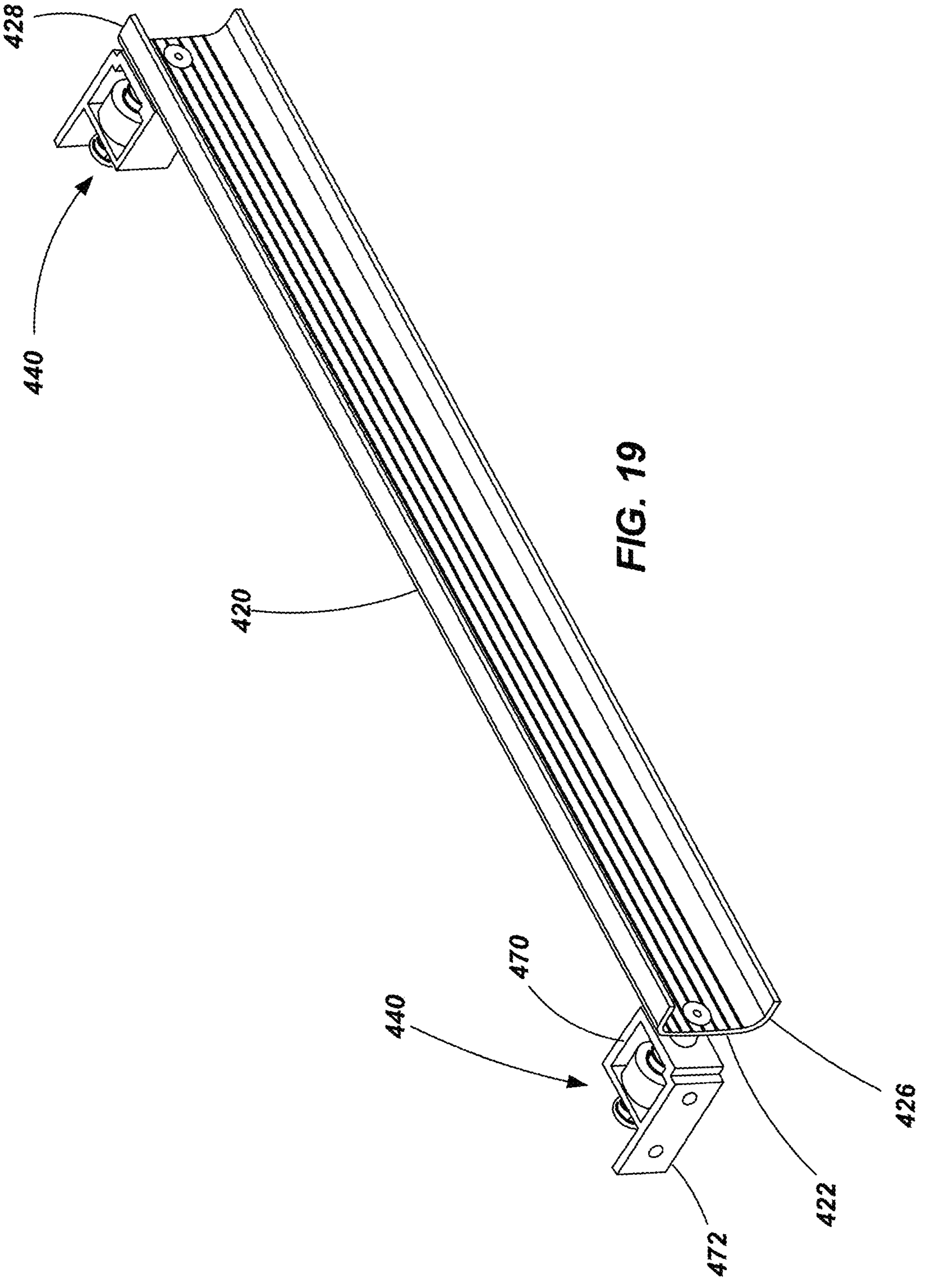
FIG. 19 is a bottom perspective view of various components of the rung assembly shown in FIG. 18.
Figure 20:
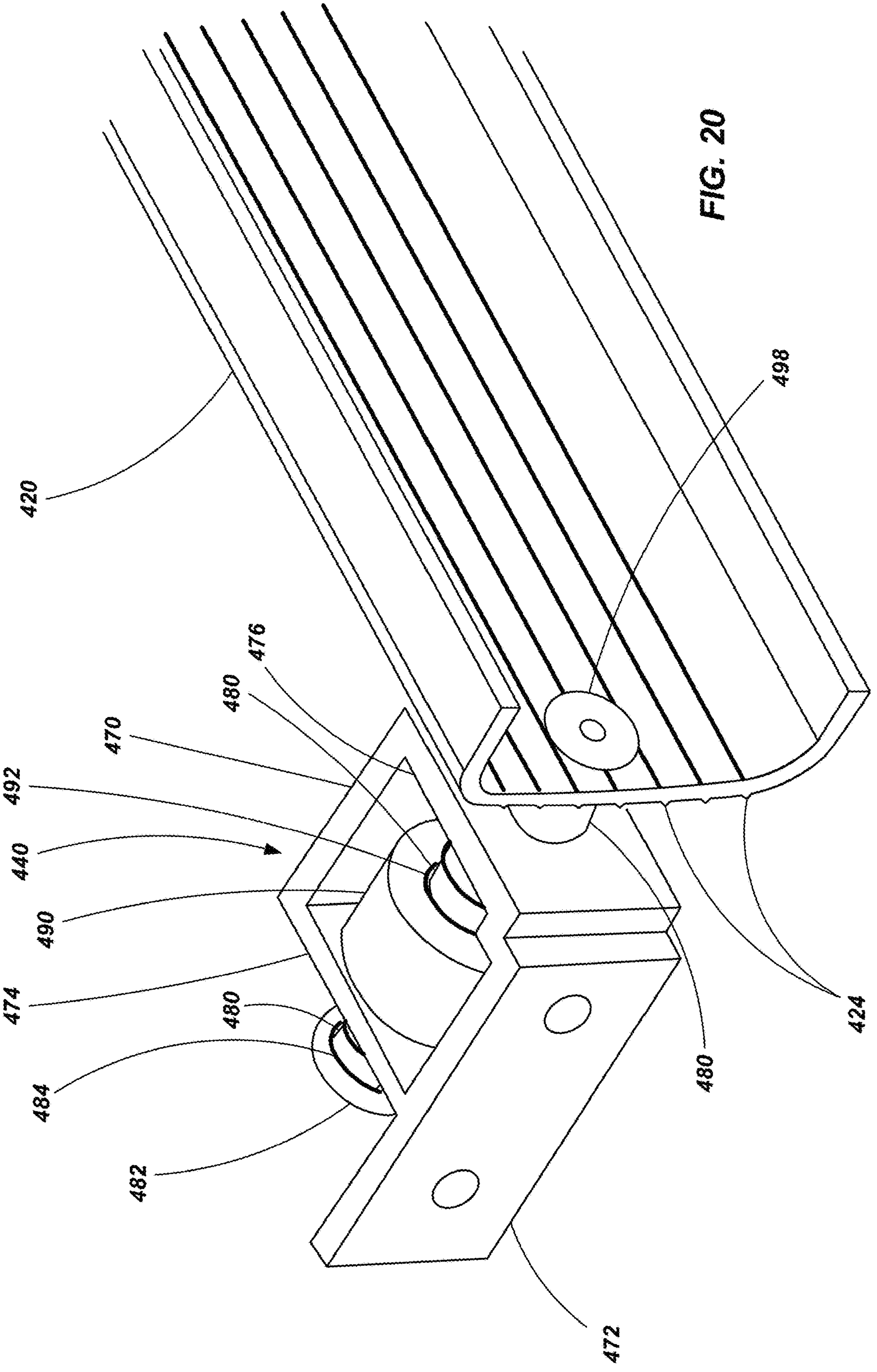
FIG. 20 is an enlarged view of a portion of the components shown in FIG. 18.

The rung assembly 106A includes a rung 404 (also referred to as a base member) and a displaceable member 420 that is positioned over a portion of the rung 404, but is not directly coupled with the rung 404. As seen in FIGS. 19 and 20, the displaceable member 420 includes an upper wall or tread portion 422, which may include one or more traction features 424 (e.g., ridges and grooves). The displaceable member 420 may include a rear wall 426 and a front wall 428. In the embodiment shown, the various walls 424, 426 and 428 form a C-channel or a U-shaped member that covers the upper portion of the rung or base member 420.

Figure 18:
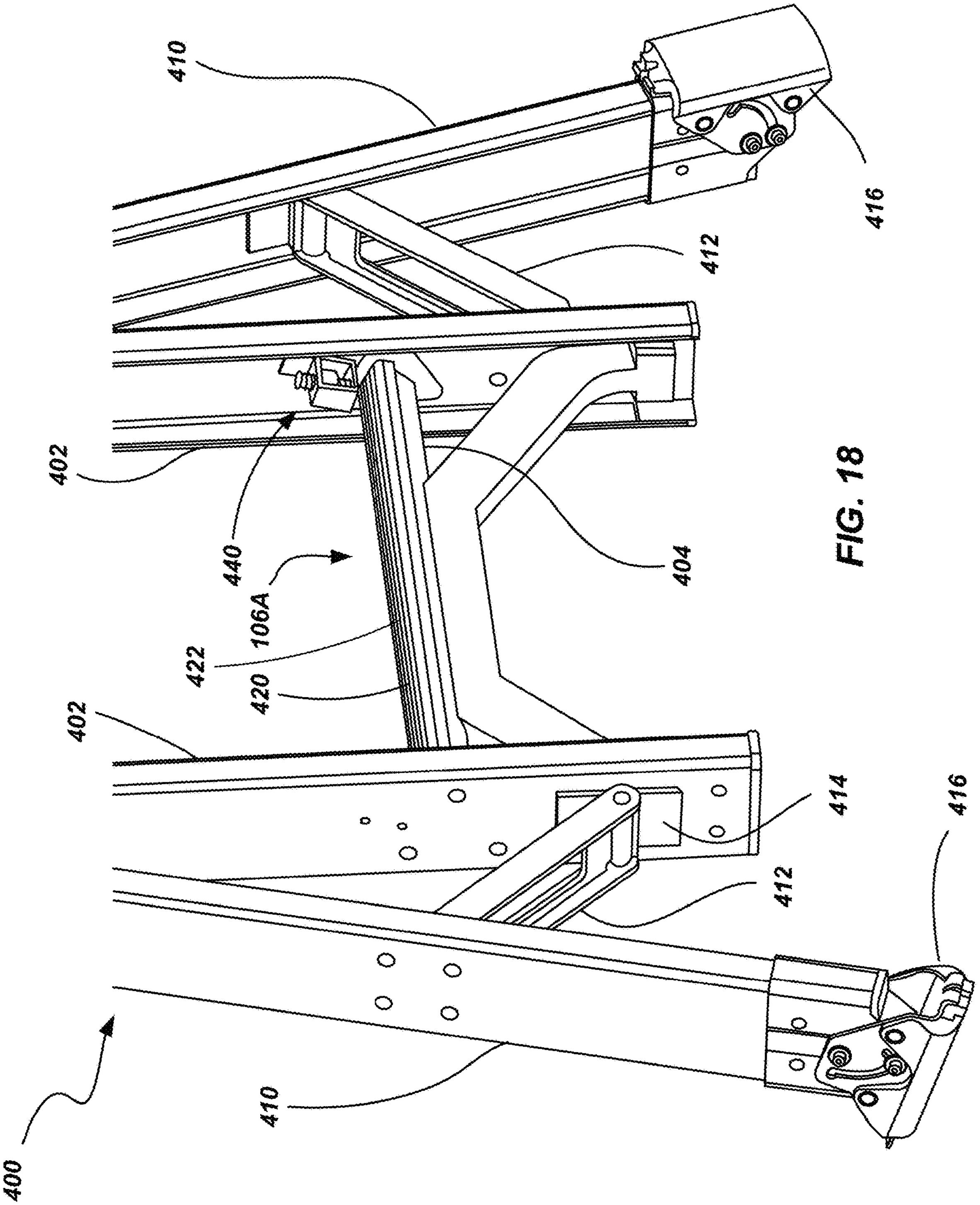
FIG. 18 depicts a portion of the ladder shown in FIG. 17 including a rung assembly according to another embodiment of the present disclosure.

The rung assembly 106A further includes one or more alert mechanisms 440 (one on each side of the rung assembly 106A as shown in FIG. 19). that, when actuated by displacement of the displaceable member 420 a desired distance relative to the rung 404 (which, in turn, is fixed relative to the rails 410) provides an alert to the user (e.g., by audible noise) informing them that they have stepped on the rung assembly 106A. Thus, for example, when the rung assembly 106A is placed as the lowermost rung of a ladder (e.g., as shown in FIG. 18), the alert mechanism 440 provides a user with information, as they descend, that they have reached the lowermost rung and that their next step downward will be to the ground or other surface supporting the ladder 400.

The alert mechanism 440 may be configured substantially similar to that which is described above with respect to the alert mechanism 170 depicted in FIGS. 6-9. However, in the embodiment shown in FIGS. 17-22, the alert mechanisms are not located beneath the displaceable member (nor are they located at least partially between the displaceable member and the associated base member), but rather the displaceable member 420 is suspended from a portion of the alert mechanisms 440.

For example, referring to FIGS. 19 and 20, the alert mechanisms 440 may include a housing member or a bracket 470 having a flange portion of 472 for coupling with an associated rail 410 of the ladder 400. The bracket 470 includes two walls 474 and 476, each having an opening formed therein. A pin member 480 extends through the openings of each wall 474 and 476. The pin member 480 includes a shoulder 482 formed along an upper portion thereof and sized to be wider than the opening formed in the upper wall 474. The shoulder 482 abuts a first biasing member 484 (e.g., a coiled spring or other member) positioned about the pin member 480 between the upper wall 474 and the shoulder 482. The shoulder 482 cooperates with the biasing member 484 to retain the pin member 480 within the bracket 470 and also biases the pin 480 upwards relative to the bracket 470.

A sleeve or collar 490 is slidably positioned about the pin member 480 between the upper and lower walls 474 and 476. Another biasing member 492 is positioned about the pin member 480 and located between the collar 490 and the lower wall 476 of the bracket 470 and biases the collar 490 upwards toward the upper wall 474. A detent mechanism (such as described hereinabove) or other retaining mechanism is associated with the pin member 480 and collar 490 to retain the collar 490 at a desired location on the pin member 480 until a force of a specified magnitude is applied against the collar 490, causing the collar 490 to rapidly slide along the pin member 480 as has been previously described herein. The collar 490 remains in the held position relative to the pin member 480 until a force is applied to the collar 490 (e.g., by the compressed biasing member 492) that is sufficient to overcome the force applied by the detent mechanism or other retention device, enabling the collar 490 to slide along the length of the pin member 480. In operation, the alert mechanism works such as described herein above with respect to the embodiment depicted in FIGS. 6-9.

Figure 21:
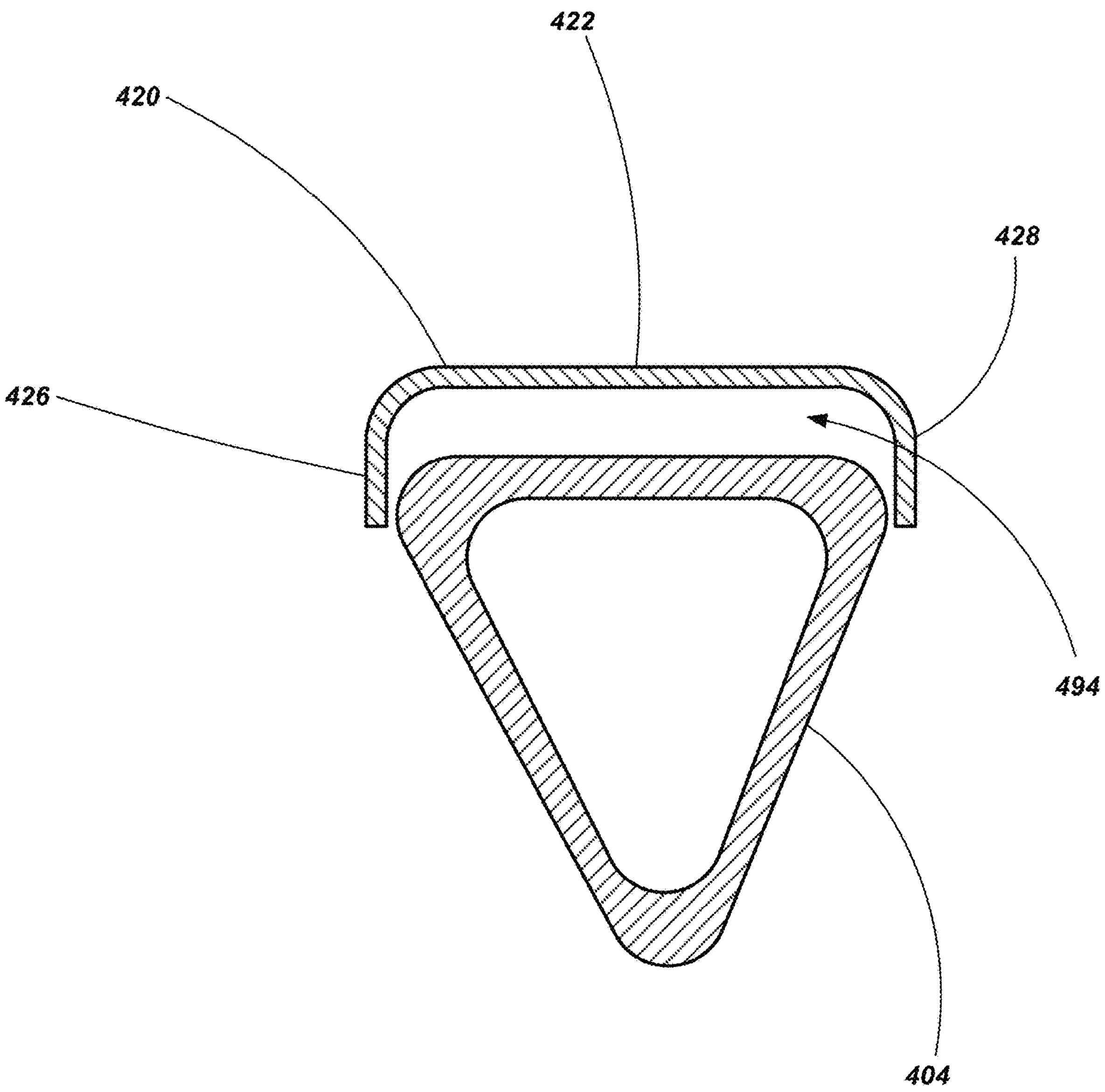
FIGS. 21 and 22 are sections views of certain components of the rung assembly shown in FIG. 18 while in an unactuated and actuated state, respectively.
Figure 22:
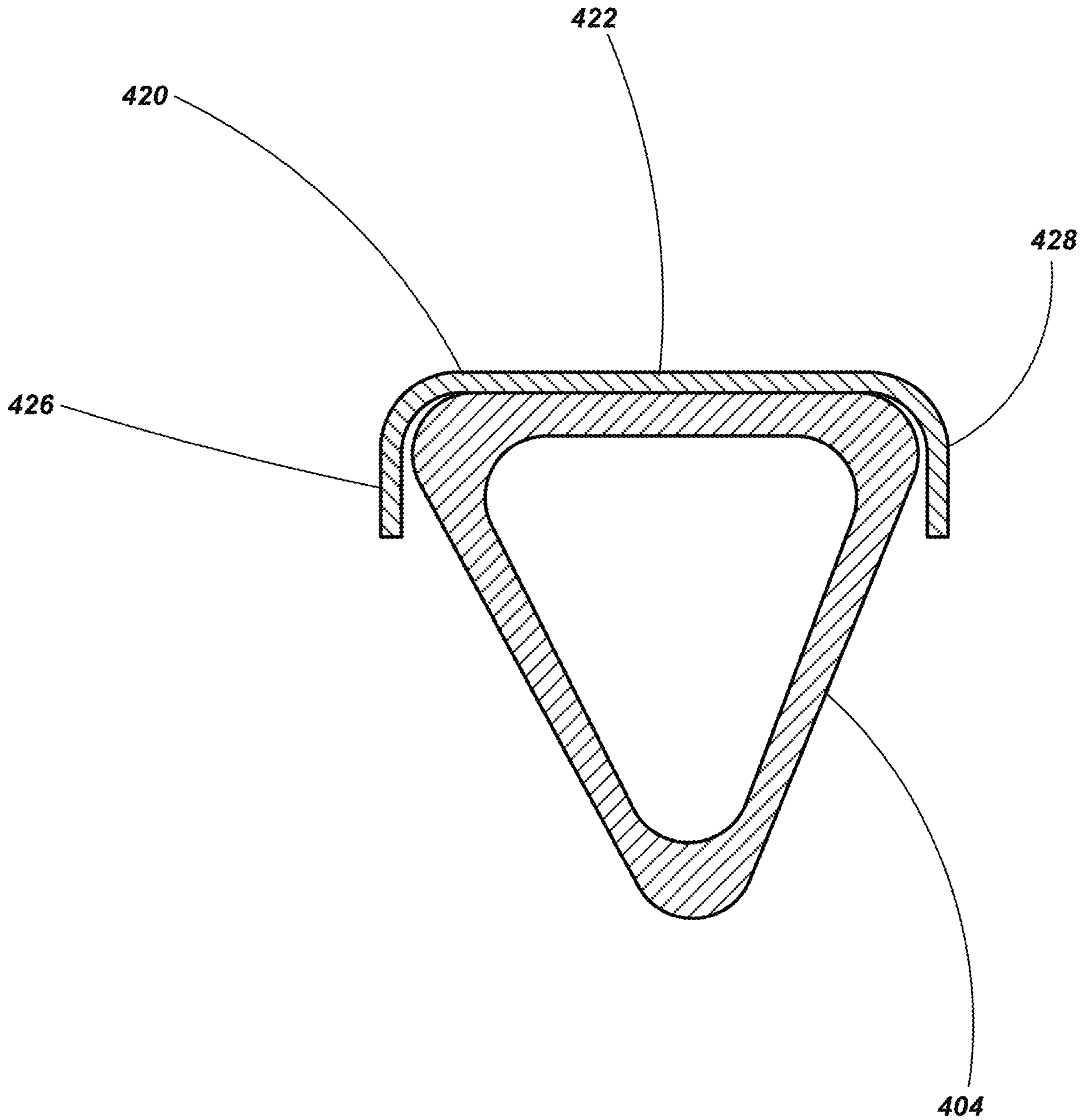

The displaceable member 420 is coupled to a lower end of the pin member 480 (e.g., by way of a screw or other mechanical fastener 498) and pulls the pin member 480 of each alert mechanism downward when a user steps on the displaceable member 420. As seen in FIGS. 21 and 22, when no external force is applied to the displaceable member 420, the displaceable member remains in an unactuated state wherein a space or gap 494 exists between a lower surface of the upper wall 422 and an upper surface of the rung 404. Again, it is noted that in the embodiment shown in FIGS. 19-22, the displaceable member 420 is not directly coupled with the associated rung 404. Indeed, when unactuated, the displaceable member 420 may not even contact the associated rung 404. However, when a user steps on the displaceable member 420, the gap 494 is reduced (and may be eliminated) as the displaceable member 420 is displaced downwards toward the rung or base member 404. In such an embodiment, with the alert mechanisms being directly coupled with the rails 410, and positioned above the displaceable member 420, the rung assembly 106A may be configured with no other components or mechanisms being positioned between the displaceable member and the rung or base member 404. In other embodiments, even though the alert mechanism (or any portion thereof) is not positioned between the displaceable member 420 and the base member 404, some other component, such as a biasing member or a cushioning material might be positioned between the displaceable member 420 and the base member 404.

It is noted that, while various embodiments have been described in terms of generally mechanical assemblies, that other embodiments may also be employed such as an assembly having a sensor associated with a given rung wherein, when actuated, the sensor triggers an audible or sensory (e.g., physical vibration) alarm for a user to perceive. For example, in one embodiment, the combination of a pin/spring/detent mechanism may be replaced by a switch which is coupled with a speaker or a vibrating mechanism to effect an alarm when actuated. Of course other types of sensors and actuators may be employed as well.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A ladder, comprising:
- a first assembly comprising a pair of spaced apart rails;
- a rung assembly coupled between the pair of spaced apart rails, the rung assembly comprising:
  - a base member;
  - a first bracket directly coupled with a first rail of the pair of spaced apart rails;
  - a second bracket directly coupled with a second rail of the pair of spaced apart rails;
  - at least one biasing member disposed within and engaging with at least one of the first and second brackets; and
  - a displaceable wall disposed over a portion of the base member and having a first end and a second end, the first end being positioned opposite the second end, the first end being coupled with the first bracket, the second end being coupled with the second bracket;
- wherein the first end and the second end are configured to be displaced from a first position spaced away from the base member to a second position nearer to the base member relative to the first position.

2. The ladder of claim 1, further comprising at least one alert mechanism associated with the displaceable wall and configured to provide an audible alert when the first end and the second end of the displaceable wall are displaced from the first position to the second position.

3. The ladder of claim 1, further comprising at least one alert mechanism directly coupled with the first rail of the pair of spaced apart rails, at least one of the first end and the second end being directly coupled with the at least one alert mechanism.

4. The ladder of claim 3, wherein the displaceable wall is disposed between the at least one alert mechanism and the base member.

5. The ladder of claim 2, wherein the at least one alert mechanism includes a first alert mechanism coupled with the first rail of the pair of spaced apart rails and a second alert mechanism directly coupled with the second rail of the pair of spaced apart rails.

6. The ladder of claim 1, wherein the rung assembly is positioned to act as a lowermost rung of the ladder.

7. The ladder of claim 1, further comprising at least one alert mechanism including a pin, a collar slidably disposed about the pin, and a detent mechanism configured to hold the collar at a specified position on the pin until a force of a specified magnitude is applied to the collar.

8. The ladder of claim 7, wherein the displaceable wall is directly coupled with a lower portion of the pin.

9. The ladder of claim 7, wherein the at least one alert mechanism is positioned and configured so that the detent mechanism releases the collar when the displaceable wall is in the first position.

10. The ladder of claim 1, further comprising a pair of adjustable legs including a first leg movably coupled with the first rail of the pair of spaced apart rails and a second leg movably coupled with the second rail of the pair of spaced apart rails.

11. The ladder of claim 1, wherein the displaceable wall is movable between the first position spaced away from the base member to the second position contacting the base member.

12. A ladder, comprising:
- a pair of spaced apart rails;
- a fixed rung coupled to the pair of spaced apart rails; and
- a rung assembly coupled between the pair of spaced apart rails, the rung assembly comprising:
- a first bracket directly coupled with a first rail of the pair of spaced apart rails;
- a second bracket directly coupled with a second rail of the pair of spaced apart rails;
- a pair of pin members, a first pin member of the pair of pin members extending through the first bracket, and a second pin member of the pair of pin members extending through the second bracket;
- a pair of biasing members, a first biasing member disposed within the first bracket and about the first pin member, and a second biasing member disposed within the second bracket and about the second pin member; and
- a displaceable wall suspended from the pair of pin members, the displaceable wall being configured to be displaced from a first position adjacent to the first bracket and the second bracket to a second position farther away from the first bracket and the second bracket relative to the first position, the displaceable wall being suspended above and detached from the fixed rung.

13. The ladder of claim 12, wherein:
- an upper surface of the fixed rung and a lower surface of the displaceable wall form a gap when the displaceable wall is in the first position; and
- the gap is reduced or eliminated when the displaceable wall is in the second position.

14. A rung assembly of a ladder, the rung assembly comprising:
- a displaceable member comprising a first end and a second end, the second end being opposite the first end;
- a first alert mechanism suspended above the first end of the displaceable member; and
- a second alert mechanism suspended above the second end of the displaceable member;
- wherein each of the first alert mechanism and the second alert mechanism comprises:
  - a bracket comprising a flange, an upper wall, a lower wall, and at least one opening defined in the lower wall, the flange being configured to directly couple to a ladder side rail above a rung;
  - a pin member extending through the at least one opening, the pin member comprising a shoulder on an upper pin end opposite a lower pin end, the lower pin end being coupled to the displaceable member;
  - a biasing member positioned about the pin member and positioned between the upper wall and the lower wall; and a collar slidably positioned about the pin member and between the upper wall and the lower wall, the collar being biased toward the upper wall via the biasing member.

15. The rung assembly of claim 14, wherein the flange includes a flange portion configured to be directly attached to a vertical surface of the ladder side rail, the flange portion defining additional openings sized and shaped to receive fasteners coupling the flange portion to the vertical surface, and the flange portion being oriented perpendicular to the displaceable member.

16. The rung assembly of claim 14, further comprising a detent mechanism configured to hold the collar at a specified position on the pin member until a force of a specified magnitude is applied to the collar.

17. The rung assembly of claim 16, wherein upon release of the collar in response to the force of the specified magnitude being applied to the collar, the collar is configured to slide upward and slap the upper wall to create an audible alert.

18. The rung assembly of claim 14, wherein the pin member is configured to be pulled downward at the lower pin end in response to an applied force at the displaceable member.

19. The rung assembly of claim 14, further comprising a fastener received at the lower pin end, the fastener configured to couple the lower pin end to the displaceable member.

* * * * *